United States Patent
Vitthaladevuni et al.

(10) Patent No.: US 12,361,277 B2
(45) Date of Patent: Jul. 15, 2025

(54) ENCODING TECHNIQUES FOR NEURAL NETWORK ARCHITECTURES

(71) Applicant: QUALCOMM Incorporated, San Diego, CA (US)

(72) Inventors: Pavan Kumar Vitthaladevuni, San Diego, CA (US); Taesang Yoo, San Diego, CA (US); Naga Bhushan, San Diego, CA (US); June Namgoong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1143 days.

(21) Appl. No.: 17/194,077

(22) Filed: Mar. 5, 2021

(65) Prior Publication Data
US 2022/0284282 A1    Sep. 8, 2022

(51) Int. Cl.
| | |
|---|---|
| *G06N 3/08* | (2023.01) |
| *G06N 3/04* | (2023.01) |
| *G06T 9/00* | (2006.01) |
| *H04W 24/08* | (2009.01) |

(52) U.S. Cl.
CPC .............. *G06N 3/08* (2013.01); *G06N 3/04* (2013.01); *G06T 9/00* (2013.01); *G06T 9/002* (2013.01); *H04W 24/08* (2013.01)

(58) Field of Classification Search
CPC ... G06N 3/08; G06N 3/04; G06T 9/00; G06T 9/002; H04W 24/08
See application file for complete search history.

(56) References Cited

U.S. PATENT DOCUMENTS

2020/0027247 A1    1/2020  Minnen et al.

FOREIGN PATENT DOCUMENTS

| | | |
|---|---|---|
| EP | 3564864 A1 | 11/2019 |
| WO | WO-2020068498 A1 | 4/2020 |

OTHER PUBLICATIONS

International Search Report and Written Opinion—PCT/US2022/015285—ISA/EPO—May 16, 2022.
Guo J., et al., "Convolutional Neural Network based Multiple-Rate Compressive Sensing for Massive MIMO CSI Feedback: Design, Simulation, and Analysis", arXiv:1906.06007v1 [eess.SP], Jun. 14, 2019, pp. 1-28.

(Continued)

*Primary Examiner* — On S Mung
(74) *Attorney, Agent, or Firm* — Holland & Hart LLP

(57) ABSTRACT

Methods, systems, and devices for wireless communications are described. A user equipment (UE) may receive an indication of one or more encoding operations to use for encoding a compressed dataset, the one or more encoding operations including a differential encoding operation, or an entropy encoding operation, or both. In some examples, using a neural network, the UE may first encode a dataset based on an additional encoding operation to generate a compressed dataset and then quantize the compressed dataset encoded based on the additional encoding operation. Subsequently, after the dataset has been initially encoded and then quantized, the UE may use the indication of the one or more encoding operations to further encode and compress the dataset. The UE may then transmit the dataset to a second device based on the one or more encoding operations.

30 Claims, 20 Drawing Sheets

(56) References Cited

OTHER PUBLICATIONS

Liu Z., et al., "A Markovian Model-Driven Deep Learning Framework for Massive MIMO CSI Feedback", IEEE Transactions on Wireless Communications, arXiv:2009.09468v1 [eess.SP], Sep. 20, 2020, pp. 1-14.

Yang Q., et al., "Deep Convolutional Compression for Massive MIMO CSI Feedback", arXiv:1907.02942v1 [cs.IT], Jul. 2, 2019, 8 Pages, DOI: 10.1109/MLSP.2019.8918798.

ENCODING TECHNIQUES FOR NEURAL NETWORK ARCHITECTURES

FIELD OF TECHNOLOGY

The following relates to wireless communications, including encoding techniques for neural network architectures.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a UE may conduct several measurements of channel conditions as part of communicating with a base station. In some examples, these measurements may generate a significant amount of data to be transmitted to the base station to assist the base station in network management.

SUMMARY

The described techniques relate to improved methods, systems, devices, and apparatuses that support encoding techniques for neural network architectures. Generally, the described techniques provide for a user equipment (UE) to receive an indication of one or more encoding operations to use for encoding a compressed dataset, the one or more encoding operations including a differential encoding operation, or an entropy encoding operation, or both. In some examples, using a neural network, the UE may first encode a dataset based on an additional encoding operation (e.g., a single shot encoder) to generate a compressed dataset and then quantize the compressed dataset encoded based on the additional encoding operation. Subsequently, after the dataset has been initially encoded and then quantized, the UE may use the indication of the one or more encoding operations to further encode and compress the dataset. The UE may then transmit the dataset (e.g., encoded, quantized, and compressed dataset) to a second device (e.g., base station, additional UE, etc.) based on using the one or more encoding operations to further encode the information after using the neural network and quantizing the data. In some examples, the differential encoding operation may include an encoding of an amount of data of the compressed dataset (e.g., after the additional encoding operation) based on previous values for the amount of data, such as an initial value, an initial reconstructed value, previous reconstructed values, previous values for a same data from a previous time instance, etc.

A method for wireless communications at a UE is described. The method may include receiving an indication of one or more encoding operations to use for encoding a compressed dataset, the one or more encoding operations including a differential encoding operation or an entropy encoding operation or both; encoding, by a neural network, a dataset to generate the compressed dataset; quantizing the compressed dataset encoded by the neural network; encoding the quantized and compressed dataset based on receiving the indication of the one or more encoding operations; and transmitting the encoded, quantized, and compressed dataset to a second device after encoding the compressed dataset based on the one or more encoding operations.

An apparatus for wireless communications at a UE is described. The apparatus may include a processor, memory coupled with the processor, and instructions stored in the memory. The instructions may be executable by the processor to cause the apparatus to receive an indication of one or more encoding operations to use for encoding a compressed dataset, the one or more encoding operations including a differential encoding operation or an entropy encoding operation or both; encode, by a neural network, a dataset to generate the compressed dataset; quantize the compressed dataset encoded by the neural network; encode the quantized and compressed dataset based on receiving the indication of the one or more encoding operations; and transmit the encoded, quantized, and compressed dataset to a second device after encoding the compressed dataset based on the one or more encoding operations.

Another apparatus for wireless communications at a UE is described. The apparatus may include means for receiving an indication of one or more encoding operations to use for encoding a compressed dataset, the one or more encoding operations including a differential encoding operation or an entropy encoding operation or both; means for encoding, by a neural network, a dataset to generate the compressed dataset; means for quantizing the compressed dataset encoded by the neural network; means for encoding the quantized and compressed dataset based on receiving the indication of the one or more encoding operations; and means for transmitting the encoded, quantized, and compressed dataset to a second device after encoding the compressed dataset based on the one or more encoding operations.

A non-transitory computer-readable medium storing code for wireless communications at a UE is described. The code may include instructions executable by a processor to receive an indication of one or more encoding operations to use for encoding a compressed dataset, the one or more encoding operations including a differential encoding operation or an entropy encoding operation or both; encode, by a neural network, a dataset to generate the compressed dataset; quantize the compressed dataset encoded by the neural network; encode the quantized and compressed dataset based on receiving the indication of the one or more encoding operations; and transmit the encoded, quantized, and compressed dataset to a second device after encoding the compressed dataset based on the one or more encoding operations.

In some examples of the method, apparatuses, and non-transitory computer-readable medium described herein, receiving the indication of the one or more encoding operations may include operations, features, means, or instructions for receiving one or more parameters corresponding to the one or more encoding operations, each of the one or more parameters corresponding to a respective encoding operation of the one or more encoding operations, where the quantized and compressed dataset may be encoded based on the one or more parameters.

In some examples of the method, apparatuses, and non-transitory computer-readable medium described herein, encoding the quantized and compressed dataset may include operations, features, means, or instructions for encoding the quantized and compressed dataset using the differential encoding operation after encoding the dataset using the neural network.

In some examples of the method, apparatuses, and non-transitory computer-readable medium described herein, encoding the quantized and compressed dataset may include operations, features, means, or instructions for encoding the quantized and compressed dataset using the entropy encoding operation after encoding the dataset using the neural network.

In some examples of the method, apparatuses, and non-transitory computer-readable medium described herein, encoding the quantized and compressed dataset may include operations, features, means, or instructions for determining, after quantizing the compressed dataset encoded by the neural network, a differential value between a first value of a data in the quantized and compressed dataset at an initial time instance and a second value of the data at a second time instance after the initial time instance, where the differential value may be determined based on the indication of the one or more encoding operations and the quantized and compressed dataset may be encoded based on the differential value.

In some examples of the method, apparatuses, and non-transitory computer-readable medium described herein, encoding the quantized and compressed dataset may include operations, features, means, or instructions for determining, after quantizing the compressed dataset encoded by the neural network, a differential value between a first reconstruction value of a data in the quantized and compressed dataset at a first time instance and a second reconstruction value of the data at a second time instance after the first time instance, where the differential value may be determined based on the indication of the one or more encoding operations and the quantized and compressed dataset may be encoded based on the differential value.

In some examples of the method, apparatuses, and non-transitory computer-readable medium described herein, encoding the quantized and compressed dataset may include operations, features, means, or instructions for determining, after quantizing the compressed dataset encoded by the neural network, an initial reconstruction value for a data in the quantized and compressed dataset at an initial time instance associated with encoding the dataset and determining, after the quantizing, a differential value between an additional reconstruction value of the data at an additional time instance after the initial time instance and the initial reconstruction value for the data, where the differential value may be determined based on the indication of the one or more encoding operations and the quantized and compressed dataset may be encoded based on the differential value.

In some examples of the method, apparatuses, and non-transitory computer-readable medium described herein, the differential encoding operation may include an encoding of an amount of data of the compressed dataset based on previous values for the amount of data.

In some examples of the method, apparatuses, and non-transitory computer-readable medium described herein, the entropy encoding operation may include an encoding of the compressed dataset using one or more symbols having lengths that vary based on a probability that a symbol occurs.

A method for wireless communications at a device is described. The method may include transmitting, to a UE, an indication of one or more encoding operations for the UE to use for encoding a compressed dataset, the one or more encoding operations including a differential encoding operation or an entropy encoding operation or both; receiving, from the UE, an encoded, quantized, and compressed dataset after the compressed dataset has been encoded following a quantization operation based on the one or more encoding operations; decoding, based on the one or more encoding operations, the encoded, quantized, and compressed dataset to generate a compressed dataset; and decoding, by a neural network, the compressed dataset to generate a dataset based on decoding the encoded, quantized, and compressed dataset.

An apparatus for wireless communications at a device is described. The apparatus may include a processor, memory coupled with the processor, and instructions stored in the memory. The instructions may be executable by the processor to cause the apparatus to transmit, to a UE, an indication of one or more encoding operations for the UE to use for encoding a compressed dataset, the one or more encoding operations including a differential encoding operation or an entropy encoding operation or both; receive, from the UE, an encoded, quantized, and compressed dataset after the compressed dataset has been encoded following a quantization operation based on the one or more encoding operations; decode, based on the one or more encoding operations, the encoded, quantized, and compressed dataset to generate a compressed dataset; and decode, by a neural network, the compressed dataset to generate a dataset based on decoding the encoded, quantized, and compressed dataset.

Another apparatus for wireless communications at a device is described. The apparatus may include means for transmitting, to a UE, an indication of one or more encoding operations for the UE to use for encoding a compressed dataset, the one or more encoding operations including a differential encoding operation or an entropy encoding operation or both; means for receiving, from the UE, an encoded, quantized, and compressed dataset after the compressed dataset has been encoded following a quantization operation based on the one or more encoding operations; means for decoding, based on the one or more encoding operations, the encoded, quantized, and compressed dataset to generate a compressed dataset; and means for decoding, by a neural network, the compressed dataset to generate a dataset based on decoding the encoded, quantized, and compressed dataset.

A non-transitory computer-readable medium storing code for wireless communications at a device is described. The code may include instructions executable by a processor to transmit, to a UE, an indication of one or more encoding operations for the UE to use for encoding a compressed dataset, the one or more encoding operations including a differential encoding operation or an entropy encoding operation or both; receive, from the UE, an encoded, quantized, and compressed dataset after the compressed dataset has been encoded following a quantization operation based on the one or more encoding operations; decode, based on the one or more encoding operations, the encoded, quantized, and compressed dataset to generate a compressed dataset; and decode, by a neural network, the compressed dataset to generate a dataset based on decoding the encoded, quantized, and compressed dataset.

In some examples of the method, apparatuses, and non-transitory computer-readable medium described herein, transmitting the indication of the one or more encoding operations may include operations, features, means, or instructions for transmitting one or more parameters corresponding to the one or more encoding operations, each of the one or more parameters corresponding to a respective encoding operation of the one or more encoding operations, where the quantized and compressed dataset may be encoded based on the one or more parameters.

In some examples of the method, apparatuses, and non-transitory computer-readable medium described herein, decoding the encoded, quantized, and compressed dataset may include operations, features, means, or instructions for decoding the encoded, quantized, and compressed dataset using a differential decoding operation before decoding the dataset using the neural network.

In some examples of the method, apparatuses, and non-transitory computer-readable medium described herein, decoding the encoded, quantized, and compressed dataset may include operations, features, means, or instructions for decoding the encoded, quantized, and compressed dataset using an entropy decoding operation before decoding the dataset using the neural network.

In some examples of the method, apparatuses, and non-transitory computer-readable medium described herein, receiving the encoded, quantized, and compressed dataset may include operations, features, means, or instructions for receiving the encoded, quantized, and compressed dataset including differential values for data in the dataset that may be based on initial values for the data.

In some examples of the method, apparatuses, and non-transitory computer-readable medium described herein, receiving the encoded, quantized, and compressed dataset may include operations, features, means, or instructions for receiving the encoded, quantized, and compressed dataset including differential values for data in the dataset that may be based on previous reconstruction values for the data.

In some examples of the method, apparatuses, and non-transitory computer-readable medium described herein, receiving the encoded, quantized, and compressed dataset may include operations, features, means, or instructions for receiving the encoded, quantized, and compressed dataset including differential values for data in the dataset that may be based on initial reconstruction values for the data.

In some examples of the method, apparatuses, and non-transitory computer-readable medium described herein, the differential decoding operation may include an encoding of an amount of data of the compressed dataset based on previous values for the amount of data.

In some examples of the method, apparatuses, and non-transitory computer-readable medium described herein, the entropy decoding operation may include an encoding of the compressed dataset using one or more symbols having lengths that vary based on a probability that a symbol occurs.

DETAILED DESCRIPTION

Figure 1:
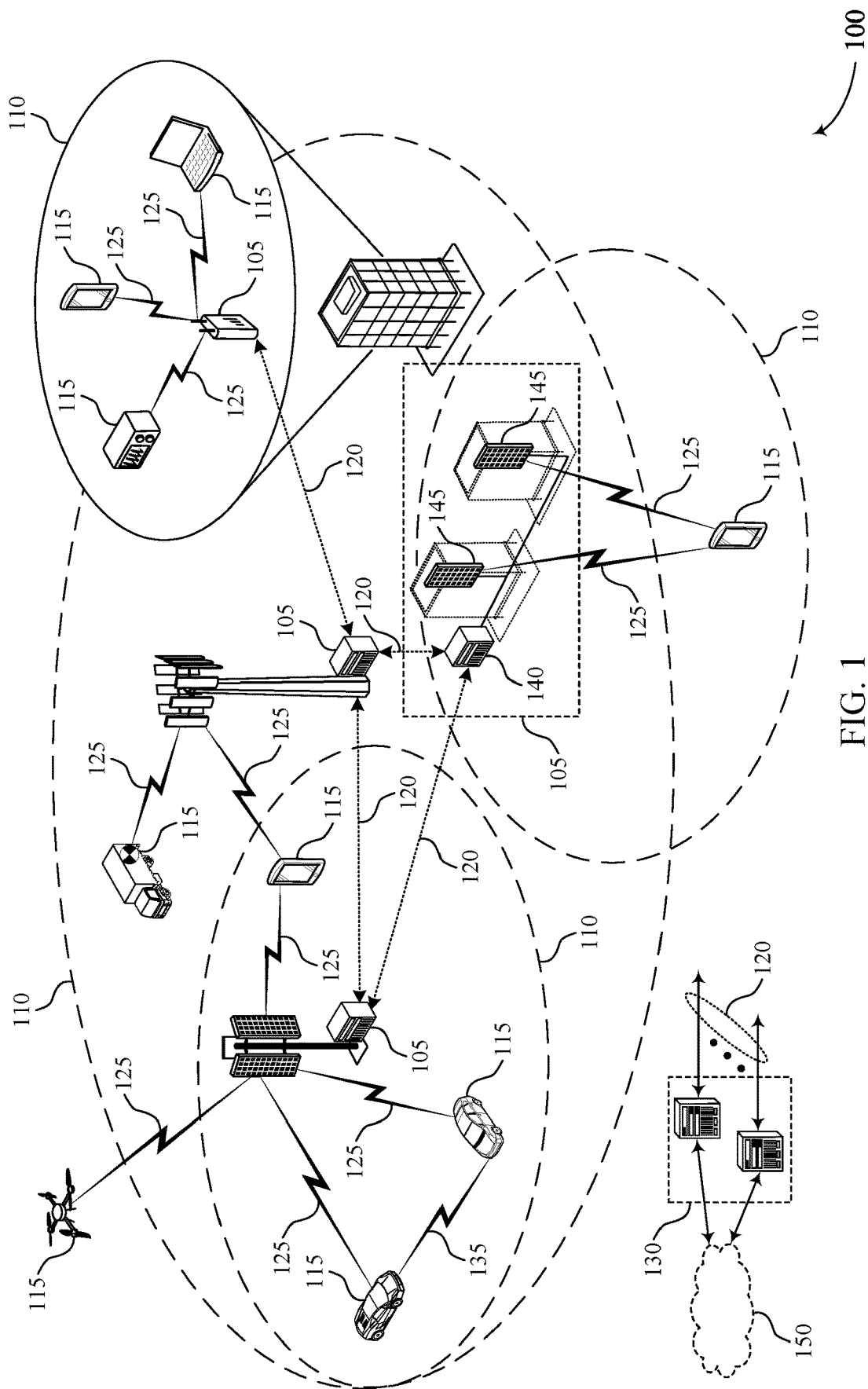
FIG. 1 illustrates an example of a wireless communications system that supports encoding techniques for neural network architectures in accordance with aspects of the present disclosure.

In some wireless communications systems, a user equipment (UE) may conduct several measurements of channel conditions as part of communicating with a base station. For example, the measurements may include per antenna port measurements of a channel and of interference (e.g., channel state feedback), power measurements from a serving cell and from neighbor cells, inter-radio access technology (RAT) measurements (e.g., such as from Wireless Fidelity (WiFi) networks), sensor measurements, etc. These measurements may generate a significant amount of data to be transmitted to the base station to assist the base station in network management. For example, wireless communication systems that use antenna panels with multiple elements may generate more measurement information than wireless communication systems that use single antennas or smaller antenna panels with fewer elements. In some examples, the UE may compress the measurements using neural networks to reduce a size of a transmission carrying the measurements. Techniques are desired to apply additional compression techniques of the measurement data in additional to the compression techniques that use neural networks.

Techniques for compressing measurement data by a UE for transmission are described. A UE may measure one or more channel conditions. The UE may then use a neural network to compress the measurement data. The output of the neural network may be quantized to provide data that is more capable of being communicated. In addition to the neural network compression, a UE may use additional layers of compression prior to sending the transmission to a base station. For example, the UE may use a differential encoding, entropy encoding, or both to further compress the measurement data after compressing the data with the neural network and prior to sending the transmission to the base station. The differential encoding may be example of encoding differences between two measurements, rather than encoding absolute values of measurements. For example, the differential encoding may use previous values, initial values, reconstruction values, initial reconstruction values, or a combination thereof to indicate differential values. In some examples, the UE may perform differential encoding, entropy encoding, or both to compress the data further after a quantization step associated with the neural network processing. Additionally or alternatively, the differential encoding may occur at an input stage of the compression operation, where bits representing the differences between measurements are initially encoded and then input to a neural network for processing. The base station may then use a differential decoding, an entropy decoding, or both when decoding the compressed, encoded transmission from the UE. In some examples, the base station may transmit indications of the differential encoding and the entropy encoding (e.g., and parameters for each encoding) for the UE to use. Thus, the encoding operations performed by the transmitting device (e.g., UE) and the decoding operations performed by the receiving device (e.g., the base station) may be coordinated.

Aspects of the disclosure are initially described in the context of wireless communications systems. Additionally, aspects of the disclosure are illustrated through an additional wireless communications system, compression procedures, compression configurations, compression and encoding configurations, and a process flow. Aspects of the disclosure are further illustrated by and described with reference to apparatus diagrams, system diagrams, and flowcharts that relate to encoding techniques for neural network architectures.

FIG. 1 illustrates an example of a wireless communications system 100 that supports encoding techniques for neural network architectures in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a quantity of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The quantity of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the quantity of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a quantity of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a quantity of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Machine learning, especially deep machine learning, has become a popular tool in wireless communications systems to promote more efficient communications. For example, among other benefits, machine learning models deployed at a UE 115 may enable the UE 115 to make decisions or perform actions (e.g., using prediction or regression or other targets) without additional signaling from a base station 105 (e.g., the UE 115 can make an inference about an action to perform based on an input or detected event). Additionally, the machine learning models may enable the UE 115 to prepare transmissions for more efficient communications (e.g., using classification or compression or other targets). Before the machine learning models can be deployed on devices, the machine learning models may be prepared and trained (e.g., a using a dataset).

Machine learning models using neural networks may be deployed on devices (e.g., UEs 115) for different applications (e.g., prediction, classification, compression, regression, or other targets). For example, the machine learning model may include one or more parameters (e.g., prepared datasets) that, when identified by the devices, enable or support a corresponding application at the devices. To build and further train the machine learning models, a network device may collect different datasets to identify implications or effects of the datasets for the different applications. That is, a machine learning model may be trained on one or more datasets using the neural networks, and when real-world data is input to the machine learning model, the machine learning model may generate an output based on the dataset.

Additionally, a UE 115 may conduct several measurements of channel conditions as part of communicating with a base station 105. For example, the measurements may include per antenna port measurements of a channel and of interference (e.g., channel state feedback), power measurements from a serving cell and from neighbor cells, inter-RAT measurements (e.g., such as from WiFi networks), sensor measurements, etc. These measurements may generate a significant amount of data to be transmitted to the base station 105 to assist the base station 105 in network management. In some cases, the UE 115 may employ a machine learning model or a neural network to compress this significant amount of data to be transmitted.

In some examples, the quantities measured by the UE 115 (e.g., in a 5G network) may be dependent on multiple parameters. For example, the multiple parameters that can affect the measurements may include antenna design and placement measurements at the UE 115 and their time-varying blockage, environment parameters (e.g., location, shadowing, presence and movement of reflectors in a neighborhood of the UE 115 and/or the base station 105, etc., where the placement of reflectors can also give rise to inter-tap correlation, such as a resolution of broad paths/ beams being split into many multiple paths), a loading on a cell (e.g., resulting in handoffs), a movement of the UE 115 in question (e.g., a change in its orientation), etc. To account for these types of changing parameters that can affect measurements, the UE 115 may use or may be implemented by neural networks that learn the dependence of the measured quantities on individual parameters, isolate those measured quantities through various layers, and compress the measurements, while reducing (e.g., minimizing) the compression loss. For example, the UE 115 may compress the measurements using neural networks to reduce a size of a transmission carrying the measurements. However, further techniques are desired to enhance the compression techniques of the measurement data using neural networks.

Wireless communications system 100 may support adding additional layers to a compression operation when a UE 115 is compressing data in a transmission prior to sending the transmission to a base station 105. For example, the UE 115 may measure one or more channel conditions and then use a neural network to compress the measurement data. In some examples, the UE 115 may quantize the output of the neural network to provide data that is more capable of being communicated. Subsequently, after the neural network compression, the UE 115 may add the additional layers to further compress the data, where the UE 115 may use a differential encoding, entropy encoding, or both to further compress and encode the measurement data prior to sending the transmission to the base station. The differential encoding may be example of encoding differences between two measurements, rather than encoding absolute values of measurements. For example, the differential encoding may use previous values, initial values, reconstruction values, initial reconstruction values, or a combination thereof to indicate differential values. The base station 105 may then use a differential decoding, an entropy decoding, or both when decoding the encoded, quantized, and compressed transmission from the UE 115. In some examples, the base station 105 may transmit indications of the differential encoding and the entropy encoding (e.g., and parameters for each encoding) for the UE 115 to use.

Figure 2:
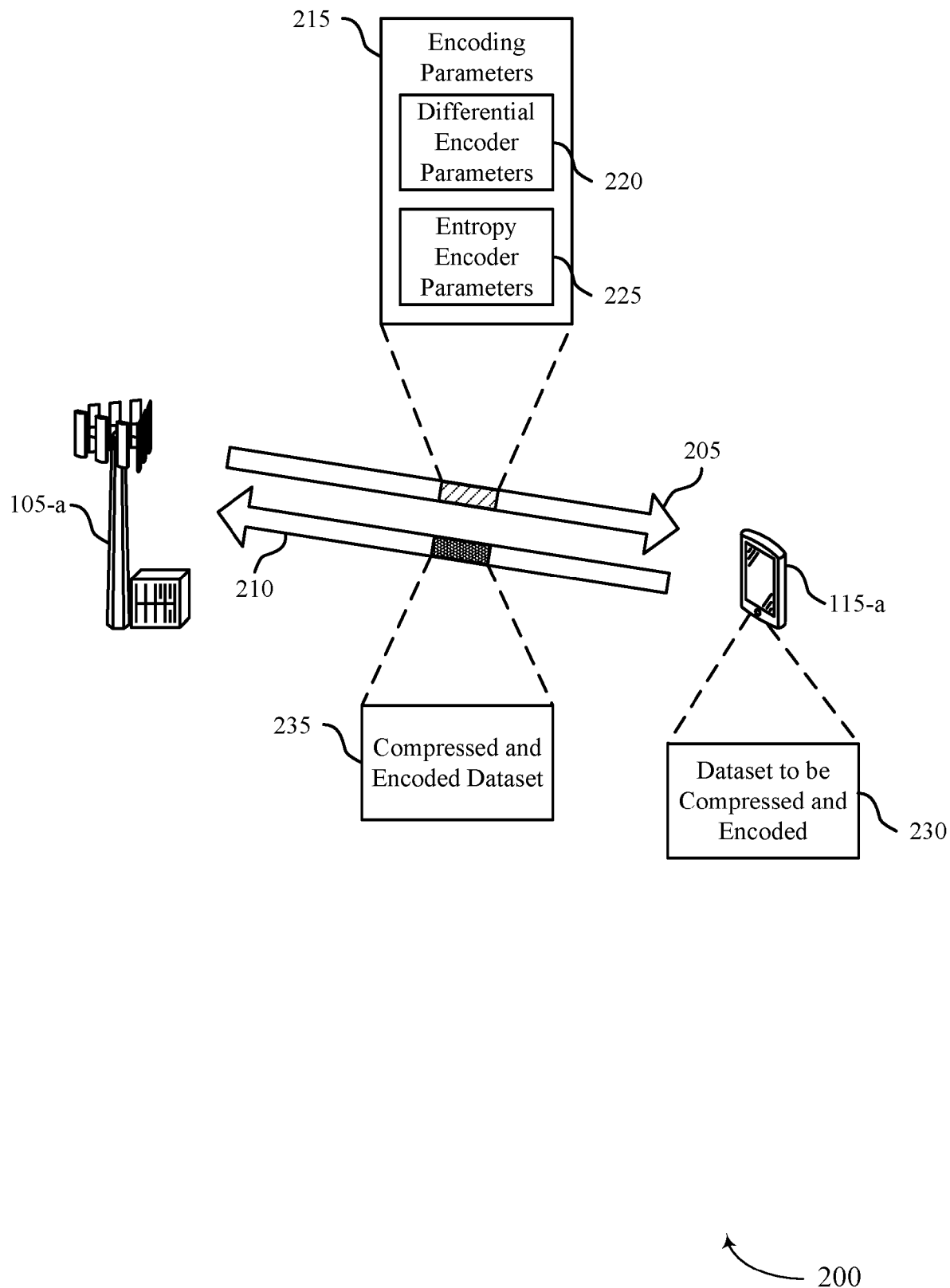
FIG. 2 illustrates an example of a wireless communications system that supports encoding techniques for neural network architectures in accordance with aspects of the present disclosure.

FIG. 2 illustrates an example of a wireless communications system 200 that supports encoding techniques for neural network architectures in accordance with aspects of the present disclosure. In some example, wireless communications system 200 may implement aspects of or may be implemented by aspects of wireless communications system 100. For example, wireless communications system 200 may include a base station 105-a and a UE 115-a, which may be examples of corresponding base stations 105 and UEs 115, respectively, as described with reference to FIG. 1. Additionally, base station 105-a and UE 115-a may communicate on resources of a carrier 205 (e.g., for downlink communications) and of a carrier 210 (e.g., for uplink communications). Although shown as separate carriers, carrier 205 and carrier 210 may include same or different resources (e.g., time and frequency resources) for the corresponding transmissions.

As described herein, using the nature of a quantity being compressed (e.g., a data in a dataset), UE 115-a may use a step-by-step extraction and compression of each feature (e.g., dimension) that affects the quantity using a neural network. For example, UE 115-a may identify a feature (e.g., dimension) to compress. In some examples, UE 115-a may perform one type of operation in that dimension and may perform a common operation on other dimensions. For example, UE 115-a may use a fully connected later on a first dimension and may use convolutions (e.g., point-wise convolutions) on other dimensions. Subsequently, UE 115-a may then perform an extraction that contains additional stacked layers. For example, the additional stacked layers may include convolution layers, fully connected layers, or other layers with or without activations (e.g., residual neural network (ResNet) layers). After the extraction, a neural network employed on UE 115-a may compress the feature. For example, the neural network may use a convolutional or fully connected layer or another type of layer for this compression. UE 115-a may repeat this process for subsequent features. After each feature has been extracted and compressed, UE 115-a may use one or more additional compression layers (e.g., convolutional, fully connected, or another type of layer). Using the techniques described herein, UE 115-a may then perform additional encoding for a final compression, such as a differential encoding, an entropy encoding, or both.

The differential encoding may include encoding differences between two measurements, rather than encoding absolute values of measurements. For example, a first signal power measurement taken at a first time may be compared with a second signal power measurement taken at a second time. In differential encoding, the difference between the first signal power measurement and the second power measurement may be communicated rather than the absolute value of the second signal power measurement. Because some measurements do not change much over time, some differential data may use fewer bits than absolute values of data. Additionally, the entropy encoding may include compressing a quantity of encoded bits to reduce a quantity of bits in the transmission. In some examples, an entropy encoding scheme may use symbols having quantities of bits that are inversely proportional to the probability of the symbols occurring. For example, symbols that are more likely to occur may be encoded using fewer bits than symbols that are less likely to occur.

In some examples, UE 115-a may perform differential encoding, entropy encoding, or both to compress the data further after a quantization step associated with the neural network processing. Additionally or alternatively, the differential encoding may occur at an input stage of the compression operation, where bits representing the differences between measurements are initially encoded and then input to a neural network for processing. Base station 105-a may then use a differential decoding, an entropy decoding, or both when decoding the compressed, encoded transmission from UE 115-a.

Before performing these compression and encoding operations, base station 105-a may indicate that UE 115-a is to perform the different compression and encoding operations. For example, base station 105-a may transmit an indication of encoding parameters 215 to UE 115-a (e.g., via carrier 205). In some examples, the encoding parameters 215 may include differential encoder parameters 220, entropy encoder parameters 225, or both. One or more encoder parameters may enable and indicate UE 115-a to use the corresponding encoder when compressing and encoding data (e.g., measurement data) prior to transmitting the data to base station 105-a. For example, UE 115-a may detect or determine a dataset 230 to be compressed and encoded based on the encoding parameters 215 (e.g., including differential encoder parameters 220, entropy encoder parameters 225, or both). UE 115-a may then transmit a compressed and encoded dataset 235 to base station 105-a (e.g., via carrier 210) based on performing a differential encoder operation (e.g., according to differential encoder parameters 220), an entropy encoder operation (e.g., according to entropy encoder parameters 225), or both. Base station 105-*a* may then decode compressed and encoded dataset 235 based on a differential decoder operation, an entropy decoder operation, or both.

In some examples, the encoding parameters 215 may indicate how UE 115-*a* is to perform a corresponding encoder operation. For example, according to differential encoder parameters 220, base station 105-*a* may indicate which previous values UE 115-*a* is to use to perform the differential encoder operation. In some implementations, UE 115-*a* may use an initial value for a data (e.g., at an intra-coded frame (I-frame)) to determine a differential value for that data at a later time instance (e.g., at predictive frames (P-frames)). Additionally or alternatively, UE 115-*a* may use previous reconstructed values for a data to determine a differential value for that data at a later time instance. In some examples, UE 115-*a* may use an initial reconstructed value for a data to determine a differential value for that data at a later time instance. Additionally or alternatively, base station 105-*a* may indicate how UE 115-*a* is to perform the entropy encoding operation via entropy encoder parameters 225. For example, entropy encoder parameters 225 may indicate a type of an entropy encoder operation to perform (e.g., Huffman encoding, arithmetic encoding, Embedded Zerotree Wavelet (EZW) encoding, Lempel-Ziv (LZ) entropy coding, etc.) and additional parameters to enable the entropy encoder operation.

As described herein, UE 115-*a* may perform the differential encoder operation, the entropy encoder operation, or both at the output of a single shot encoder. For example, UE 115-*a* may first encode dataset 230 using a single shot encoder (e.g., additional encoder aside from the differential encoder and the entropy encoder) to compress and encode dataset 230. In some examples, after dataset 230 is encoded using the single shot encoder, UE 115-*a* may quantize the encoded dataset (e.g., encoded and compressed dataset). The quantizing of the encoded dataset may include storing or converting values in the encoded dataset at lower bitwidths than floating point predictions (e.g., floating values are converted to bits, such that values in the encoded dataset are represented by integers than floating point values). Once the encoded dataset has been quantized (e.g., the dataset is now encoded, quantized, and compressed), UE 115-*a* may then perform the differential encoder operation, the entropy encoder operation, or both before sending the further encoded, quantized, and compressed dataset to base station 105-*a*. Additionally or alternatively, UE 115-*a* may perform the differential encoder operation at an input stage to the single shot encoded and perform the remaining operations described herein.

In some examples, UE 115-*a* may determine when to perform the differential encoder operation, the entropy encoder operation, or both in relation to the single shot encoder (e.g., at an input stage or an output stage) based on the corresponding indicated parameters for each encoder operation. For example, differential encoder parameters 220 may indicate when UE 115-*a* is to perform the differential encoder operation (e.g., at an input stage or an output stage of a single shot encoder operation), and entropy encoder parameters 225 may indicate when UE 115-*a* is to perform the entropy encoder operation (e.g., at the output stage of the single shot encoder operation). Additionally or alternatively, UE 115-*a* may be preconfigured with when these encoder operations are to be performed.

While UE 115-*a* is shown performing the different compression and encoding operations in the example of FIG. 2, any encoding device (e.g., a base station 105, a TRP, another type of UE 115, etc.) may perform the techniques described herein to compress and encode a dataset before transmitting the dataset to an additional device. Additionally, while base station 105-*a* is shown receiving and decoding compressed and encoded dataset 235 (e.g., an encoded, quantized, and compressed dataset), any decoding device (e.g., a UE 115, a TRP, another type of base station 105, etc.) may perform the techniques described herein to decode compressed and encoded dataset 235.

Figure 3A:
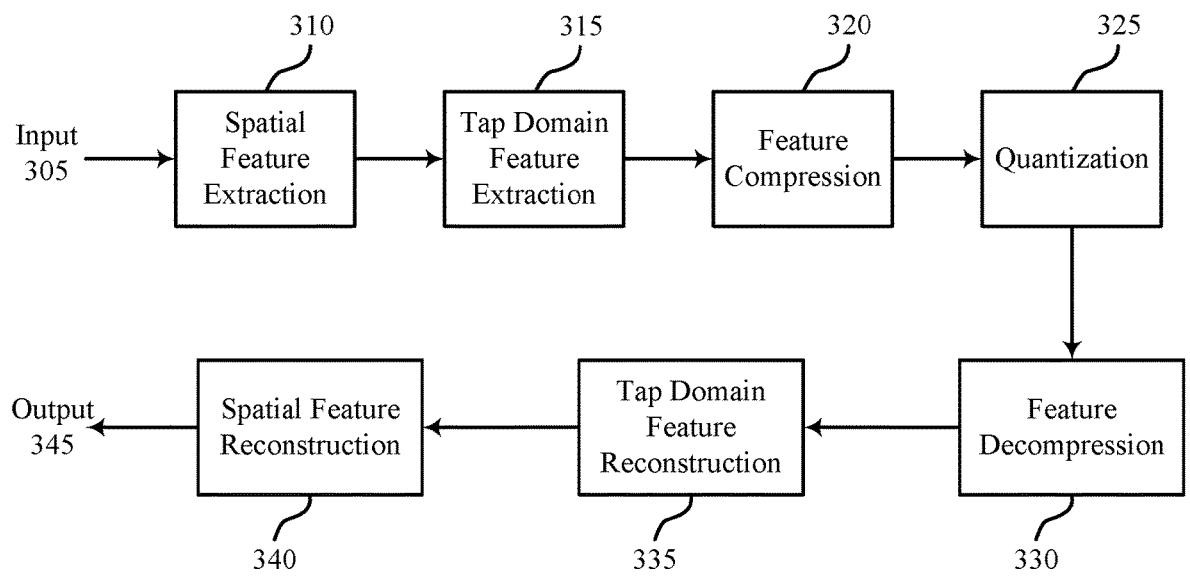
FIGS. 3A and 3B illustrate examples of compression procedures that support encoding techniques for neural network architectures in accordance with aspects of the present disclosure.
Figure 3B:
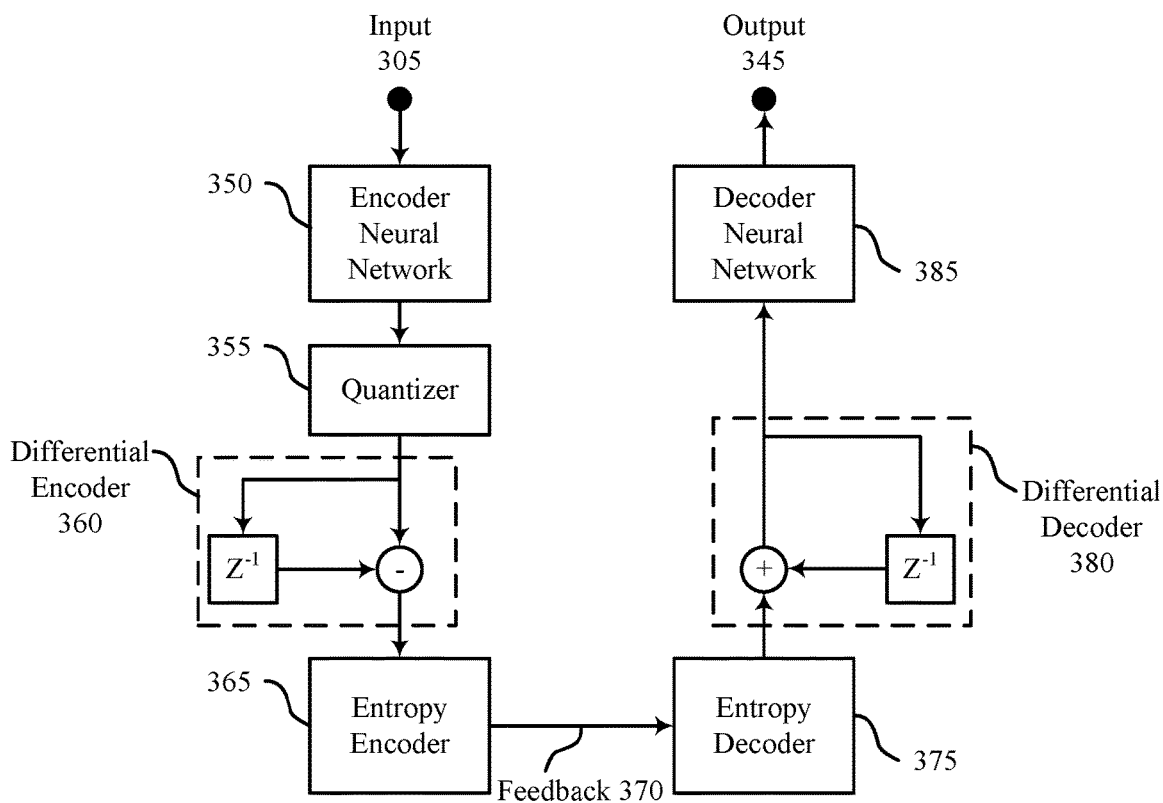

FIGS. 3A and 3B illustrate examples of a compression procedure 300 and a compression procedure 301, respectively, that support encoding techniques for neural network architectures in accordance with aspects of the present disclosure. In some examples, compression procedure 300 and compression procedure 301 may implement aspects of or may be implemented by aspects of wireless communications system 100, wireless communications system 200, or both. For example, an encoding device (e.g., a UE 115 or an additional encoding device) may be configured to perform one or more operations on samples (e.g., data) received via one or more antennas of the encoding device to compress the samples. Subsequently, a decoding device (e.g., a base station 105 or an additional decoding device) may be configured to decode the compressed samples to determine information, such as channel state feedback.

In some examples, the encoding device may identify a feature to compress. For example, the encoding device may perform a first type of operation in a first dimension associated with the feature to compress. The encoding device may perform a second type of operation in other dimensions (e.g., in all other dimensions). For example, the encoding device may perform a fully connected operation on the first dimension and convolution (e.g., pointwise convolution) in other dimensions. The identified feature to compress may be part of an input 305 (e.g., h(t) or $h_{in}$) for compression procedure 300. The different operations shown for compression procedure 300 may include multiple neural network layers and/or operations. Neural networks of the encoding device and the decoding device may be formed by concatenation of one or more of the shown operations.

The encoding device may perform a spatial feature extraction 310 on the data (e.g., input 305). Subsequently, the encoding device may perform a tap domain feature extraction 315 on the data. In some examples, the encoding device may perform the tap domain feature extraction before performing the spatial feature extraction. Additionally, an extraction operation may include multiple operations. For example, the multiple operations may include one or more convolution operations, one or more fully connected operations, etc., that may be activated or inactive. In some examples, an extraction operation may include one or more ResNet operations.

After performing spatial feature extraction 310 and tap domain feature extraction 315 (e.g., extraction operations), the encoding device may compress one or more features that have been extracted using a feature compression 320. In some examples, feature compression 320 (e.g., a compression operation) may include one or more operations, such as one or more convolution operations, one or more fully connected operations, etc. After compression, a bit count of an output may be less than a bit count of an input.

Subsequently, the encoding device may perform a quantization 325 (e.g., quantization operation). In some examples, the encoding device may perform quantization 325 after flattening the output of the compression operation and/or performing a fully connected operation after flattening the output. Using spatial feature extraction 310, tap domain feature extraction 315, and feature compression 320 may represent performing or using a single shot encoder at the encoding device. The output of the single shot encoder may then be passed through quantization 325 before the encoding device sends the encoded data to the decoding device.

Accordingly, the decoding device may then perform a feature decompression 330 based on receiving the encoded data. Additionally, the decoding device may perform a tap domain feature reconstruction 335 and a spatial feature reconstruction 340 to produce an output 345 (e.g., $h_{out}$ or h(t)) that corresponds to input 305. In some examples, the decoding device may perform spatial feature reconstruction 340 before performing tap domain feature reconstruction 335. After the reconstruction operations, the decoding device may output a reconstructed version via output 345 based on input 305 from the encoding device. Using feature decompression 330, tap domain feature reconstruction 335, and spatial feature reconstruction 340 may represent performing or using a single shot decoder at the decoding device.

In some examples, the decoding device may perform operations in an order that is opposite to operations performed by the encoding device. For example, if the encoding device follows operations (A, B, C, D), the decoding device may follow inverse operations (D, C, B, A). Additionally, the decoding device may perform operations that are fully symmetric to operations of the encoding device. This use of symmetric operations may reduce a quantity of bits used for neural network configuration at the encoding device. Additionally or alternatively, the decoding device may perform additional operations (e.g., convolution operations, fully connected operation, ResNet operations, etc.) in addition to operations performed by the encoding device. That is, the decoding device may perform operations that are asymmetric to operations of the encoding device.

Based on the encoding device encoding a data set using a neural network for uplink communication, the encoding device (e.g., a UE 115) may transmit measurements (e.g., channel state feedback) with a reduced payload. This reduced payload may conserve network resources that may otherwise have been used to transmit a full data set as sampled by the encoding device. As described herein with reference to FIG. 2, the encoding device may use additional layers to perform additional encoding operations to further compress data to be transmitted to the decoding device.

For example, as shown with reference to compression procedure 301, the encoding device may apply or use a differential encoder 360, an entropy encoder 365, or both on an output of a single shot encoder to further compress a feedback 370 transmitted to the decoding device. The feedback 370 may be an example of the information transmitted over an air interface (or some other medium) between a transmitting device and a receiving device. Additionally, the decoding device may also use an entropy decoder 375, a differential decoder 380, or both before performing the operations of a single shot decoder described with reference to compression procedure 300 in FIG. 3A. Additionally or alternatively, although not shown, the encoding device may apply or use differential encoder 360 at an input stage to the single shot encoder, and the decoding device may apply or use differential decoder 380 on an output of the single shot decoder. In some examples, compression procedure 301 may be referred to as a temporal compression operation or procedure.

As shown in the example of FIG. 3B, the encoding device may take input 305 and put input 305 through an encoder neural network 350. In some examples, encoder neural network 350 may correspond to spatial feature extraction 310, tap domain feature extraction 315 and feature compression 320 as described with reference to FIG. 3A (e.g., the single shot encoder). After input 305 has gone through encoder neural network 350, the encoding device may use a quantizer 355 to perform a quantization operation (e.g., quantization 325 as described with reference to FIG. 3A). Subsequently, the encoding device may then use or apply differential encoder 360, entropy encoder 365, or both to the quantized output of encoder neural network 350. In some examples, differential encoder 360 and entropy encoder 365 may be performed as described with reference to FIG. 2. The encoding device may then transmit feedback 370 to the decoding device, where feedback 370 represents an encoded, quantized, and compressed dataset.

The decoding device may receive feedback 370 and may use or apply entropy decoder 375, differential decoder 380, or both to partially decode and decompress the encoded, quantized, and compressed dataset received with feedback 370. After using or applying entropy decoder 375, differential decoder 380, or both, the decoding device may then pass the partially decoded and decompressed dataset through a decoder neural network 385 to generate output 345. In some examples, decoder neural network 385 may include feature decompression 330, tap domain feature reconstruction 335, and spatial feature reconstruction 340 (e.g., and any additional layers) as described with reference to FIG. 3A.

Figure 4:
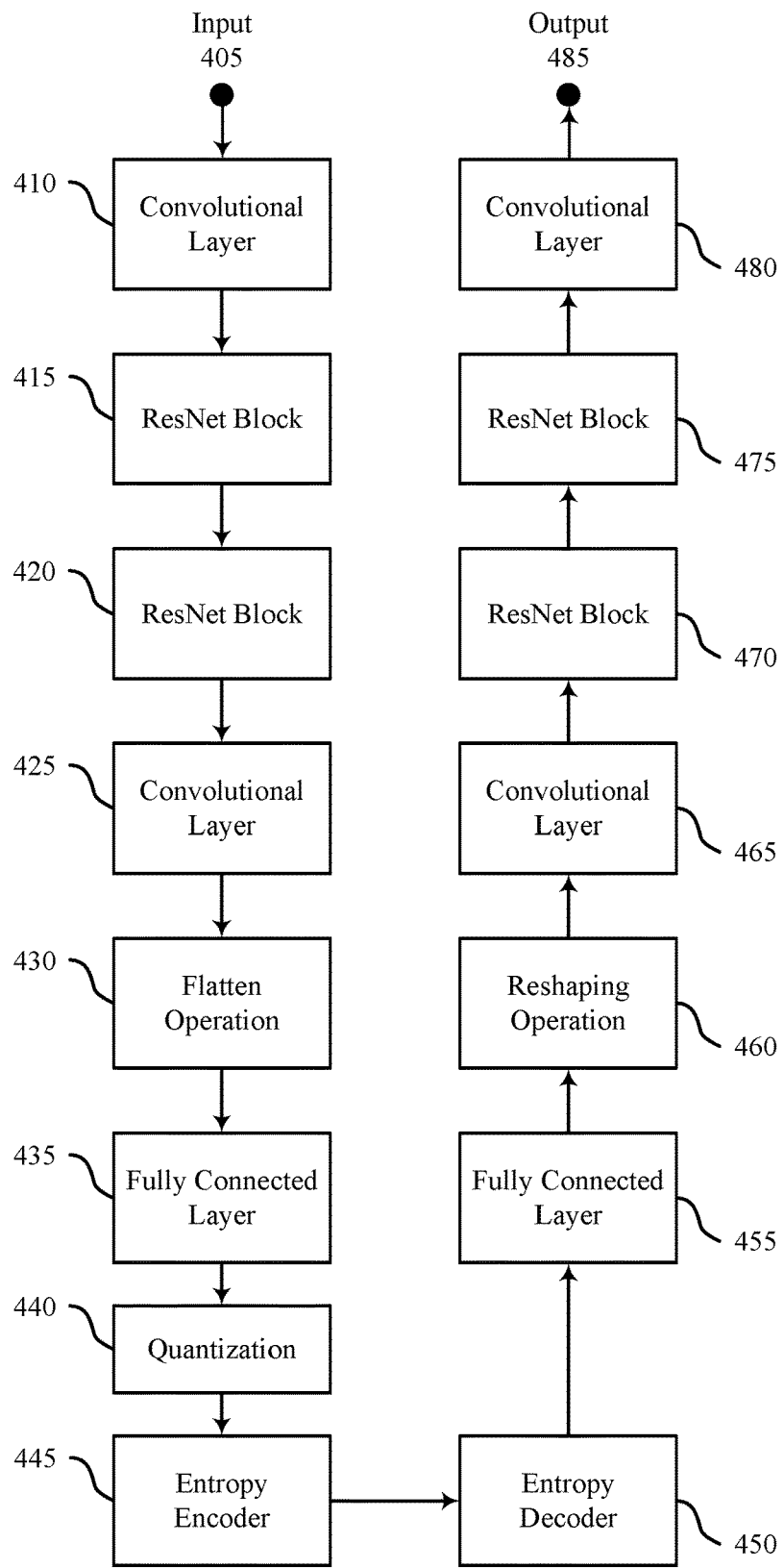
FIG. 4 illustrates an example of a compression configuration that supports encoding techniques for neural network architectures in accordance with aspects of the present disclosure.

FIG. 4 illustrates an example of a compression configuration 400 that supports encoding techniques for neural network architectures in accordance with aspects of the present disclosure. In some examples, compression configuration 400 may implement aspects of or may be implemented by aspects of wireless communications system 100, wireless communications system 200, or both. For example, an encoding device (e.g., a UE 115 or an additional encoding device) may be configured to perform one or more operations on samples (e.g., data) received via one or more antennas of the encoding device to compress the samples. Subsequently, a decoding device (e.g., a base station 105 or an additional decoding device) may be configured to decode the compressed samples to determine information, such as channel state feedback. In some examples, compression configuration 400 may represent an example of a channel state feedback compression operation or procedure with entropy encoding.

The encoding device may identify an input 405 for performing compression configuration 400. For example, input 405 may include a dataset (e.g., multiple measurements, such as channel state feedback measurements) to be compressed and encoded. In some examples, the encoding device may receive sampling from antennas, where input 405 represents a 64×64 dimension data set received from its antennas based on a quantity of antennas, a quantity of samples per antenna, and a tap feature. The 64×64 dimension data set may represent one, non-limiting example for input 405. The encoding device may pass the input 405 to or through a first convolutional layer 410. For example, first convolutional layer 410 may represent an initial layer for spatial feature extraction and short temporal (tap) feature extraction using a one-dimensional convolution (e.g., Conv1D). The first convolutional layer 410 (e.g., an additional convolutional layers) may be a fully connected layer (e.g., in antennas) and simple convolution with a small kernel size (e.g., 3) in the tap dimension (to extract the short tap feature). Output from such a 64×W one-dimensional convolution operation may be a W×64 matrix.

After first convolutional layer 410, the encoding device may perform one or more ResNet operations using one or more corresponding ResNet blocks, such as a ResNet block 415 and a ResNet block 420. The one or more ResNet operations may further refine the spatial feature and/or the temporal feature. In some examples, a ResNet operation may include multiple operations associated with a feature. For example, a ResNet operation may include multiple (e.g., 3) one-dimensional convolution operations, a skip connection (e.g., between input of the ResNet and output of the ResNet to avoid application of the one-dimensional convolution operations), a summation operation of a path through the multiple one-dimensional convolution operations and a path through the skip connection, or additional operations. In some examples, the multipleone1-dimensional convolution operations may include a W×256 convolution operation with kernel size 3 with output that is input to a batch normalization (BN) layer followed by a rectified linear unit (ReLU) activation (e.g., such as a LeakyReLU activation) that produces an output data set of dimension 256×64, a 256×512 convolution operation with kernel size 3 with output that is input to a BN layer followed by an ReLU activation that produces an output data set of dimension 512×64, and a 512×W convolution operation with kernel size 3 that outputs a BN data set of dimension W×64. Output from the one or more ResNet operations may be a W×64 matrix.

The encoding device may use an additional convolutional layer 425 to perform a W×V convolution operation on output from the one or more ResNet operations. The W×V convolution operation may include a pointwise (e.g., tap-wise) convolution operation. The W×V convolution operation may compress spatial features into a reduced dimension for each tap. The W×V convolution operation may have an input of W features and an output of V features. Output from the W×V convolution operation may be a V×64 matrix.

The encoding device may perform a flattening operation 430 to flatten the V×64 matrix into a 64V element vector. The encoding device may use a fully connected layer 435 to perform a 64V×M fully connected operation to further compress the spatial-temporal feature data set into a low dimension vector of size M for transmission over the air to the decoding device. The encoding device may perform a quantization 440 before the over the air transmission of the low dimension vector of size M to map sampling of the transmission into discrete values for the low dimension vector of size M. After quantization 440, the encoding device may use or apply an entropy encoder 445 to further compress the output of quantization 440.

The decoding device may receive the entropy encoded data and may use or apply an entropy decoder 450 to decode the encoded transmission. Additionally, the decoding device may use a fully connected layer 455 to perform an M×64V fully connected operation to decompress the low dimension vector of size M into a spatial-temporal feature data set. The decoding device may perform a reshaping operation 460 to reshape the 64V element vector into a two-dimensional V×64 matrix. The decoding device may use a convolutional layer 465 to perform a V×W (with a kernel size of one (1))) convolution operation on output from the reshaping operation 460. The V×W convolution operation may include a pointwise (e.g., tap-wise) convolution operation. In some examples, the V×W convolution operation may decompress spatial features from a reduced dimension for each tap. The V×W convolution operation may have an input of V features and an output of W features. Output from the V×W convolution operation may be a W×64 matrix.

The decoding device may then perform one or more ResNet operations using one or more corresponding ResNet blocks, such as a ResNet block 470 and a ResNet block 475. The one or more ResNet operations may further decompress the spatial feature, the temporal feature, or both. In some examples, a ResNet operation may include multiple (e.g., 3) one-dimensional convolution operations, a skip connection (e.g., to avoid application of the one-dimensional convolution operations), a summation operation of a path through the multiple convolution operations and a path through the skip connection, or additional operations. Output from the one or more ResNet operations may be a W×64 matrix.

The decoding device may then use a convolutional layer 480 to perform a spatial and temporal feature reconstruction. In some examples, the a spatial and temporal feature reconstruction may be accomplished through the use of a one-dimensional convolutional operation that is fully connected in the spatial dimension (to reconstruct the spatial feature) and is a simple convolution with a small kernel size (e.g., 3) in the tap dimension (to reconstruct the short tap feature). Output from the 64×W convolution operation may be a 64×64 matrix and may be represented by an output 485. In some examples, values of M, W, and/or V may be configurable to adjust weights of the features, payload size, etc. Additionally, while a 64×64 dimension data set (e.g., 64×64 matrix) is described in the example of FIG. 4 with corresponding operations that correspond to the 64×64 dimension data set, any size data set may be used with performing the described operations herein.

Figure 5:
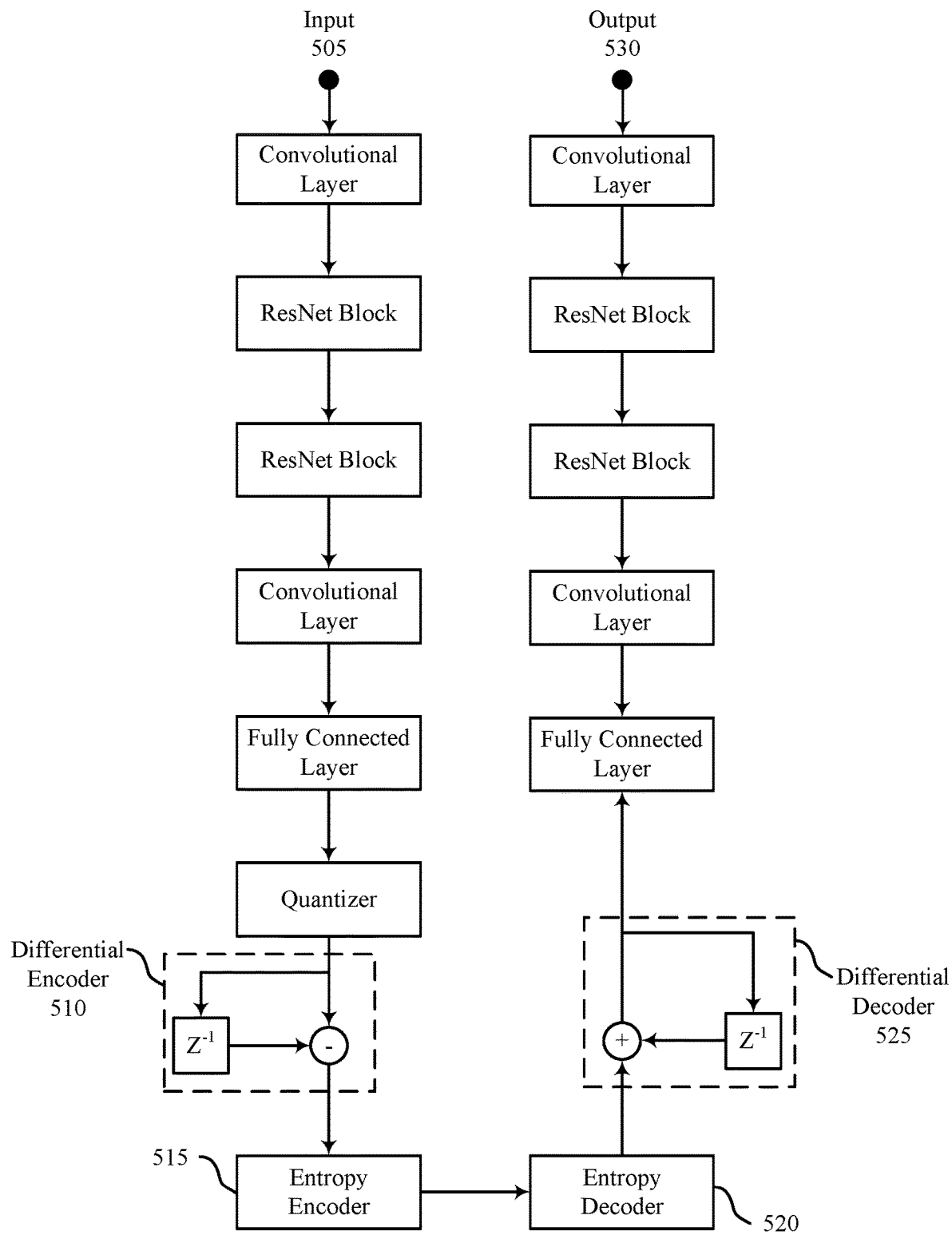
FIG. 5 illustrates an example of a compression and encoding configuration that supports encoding techniques for neural network architectures in accordance with aspects of the present disclosure.

FIG. 5 illustrates an example of a compression and encoding configuration 500 that supports encoding techniques for neural network architectures in accordance with aspects of the present disclosure. In some examples, compression and encoding configuration 500 may implement aspects of or may be implemented by aspects of wireless communications system 100, wireless communications system 200, or both. For example, an encoding device (e.g., a UE 115 or an additional encoding device) may be configured to perform one or more operations on an input 505 of samples (e.g., data) received via one or more antennas of the encoding device to compress the samples. Subsequently, a decoding device (e.g., a base station 105 or an additional decoding device) may be configured to decode the compressed samples to determine an output 530 of information, such as channel state feedback, based on input 505. In some examples, compression and encoding configuration 500 may represent a compression and encoding procedure that includes a differential encoder 510, an entropy encoder 515, or both at an output of an encoder (e.g., single shot encoder, encoder neural network, etc.). By using or applying differential encoder 510 at the output of the encoder, the encoding device may decrease or limit error propagation.

The encoding device may take input 505 and may initially encode, compress, and quantize the input 505 using one or more operations of the encoder, such as one or more convolutional layers, one or more ResNet blocks, one or more fully connected layers, and a quantizer as described with reference to FIG. 4. After being quantized (e.g., at the output of the encoder), the encoding device may use or apply differential encoder 510. As described with reference to FIG. 2, differential encoder 510 may use previous values of a data to encode the data. In some examples, the decoding device or a network device may indicate which previous values for the encoding device to use for differential encoder 510 (e.g., via one or more parameters for a differential encoding operation). For example, the encoding device may use an initial value for a data (e.g., at an I-frame) to determine a differential value for that data at a later time instance (e.g., at P-frames), may use previous reconstructed values for a data to determine a differential value for that data at a later time instance, may use an initial reconstructed value for a data to determine a differential value for that data at a later time instance, or a combination thereof.

For example, when using an initial value for a data to determine differential values for that data at a later time instance, the encoding device may compute P sub-frames (e.g., P-frames) with respect to an I-frame. A given differential value for a time instance (N−1) may be given by Equation 1.

$$(x_{N-1} - x_0) \tag{1}$$

$x_0$ may represent an initial value for the data (e.g., determined at an I-frame), and $x_{N-1}$ may represent a given value for the data (e.g., determined at a P-frame) at time N−1. The encoding device may divide the differential value for a data given by Equation 1 by $\sqrt{E\{|\Delta|^2\}}$, where E represents an error propagation value and $\Delta$ represents the difference between a given value for the data (e.g., $x_{N-1}$) and the initial value for the data (e.g., $x_0$). After dividing the differential value by $\sqrt{E\{|\Delta|^2\}}$, the encoding device may be left with a $E_P/D_P$ value, where $E_P$ represents the differential value at a given P-frame and $D_P$ represents $\sqrt{E\{|\Delta|^2\}}$ at a given P-frame.

At the decoding device side, the decoding device may receive a representation of a data given by $E_P/D_P$. Subsequently, the decoding device may multiply the received representation of the data (e.g., encoded version of the data) by $\sqrt{E\{|\Delta|^2\}}$ to generate a reconstructed version of Equation 1 given by Equation 2.

$$(\widehat{x_{N-1} - x_0}) \tag{2}$$

The decoding device may then add a reconstructed value for the initial value of the data (e.g., $\hat{x}_0$) determined by the decoding device (e.g., at an I-frame) to Equation 2 to determine and obtain a reconstructed value for the given value of the data at time N−1 (e.g., $\hat{x}_{N-1}$). By using differential encoder 510 based on initial values for data (e.g., $x_0$), error propagation for differential encoder 510 may be on the basis of the reconstructed value of the initial value of the data (e.g., $\hat{x}_0$) alone.

Additionally or alternatively, the encoding device may use a P sub-frame construction and reconstruction based on reconstructed channels when using or applying differential encoder 510 (e.g., based on one or more parameters signaled to the encoding device for differential encoder 510). Using the P sub-frame construction and reconstruction based on reconstructed channels may decrease or prevent error propagation. In some examples, the encoding device may determine a reconstructed value for a given data value. For example, the encoding device may determine an initial value for a data (e.g., $x_0$) that is divided by $\sqrt{E\{|x_0|^2\}}$, which is then given by $E_I/D_I$. At the decoding device side, $E_I/D_I$ may be multiplied by $\sqrt{E\{|x_0|^2\}}$ to determine a reconstructed value for the initial value for the data, where the reconstructed value is given by $\hat{x}_0$. The encoding device may determine $\hat{x}_0$ by performing similar actions as the decoding device or may receive an indication of the reconstructed value from the decoding device.

Subsequently, for a given P-frame after the I-frame (e.g., P-frame 1, P-frame 2, etc.), the encoding device may use a reconstructed value for a previous value to encode differential values for values at the given P-frame. For example, for a P-frame N−1 (e.g., at a time N−1), the encoding device may determine a differential value for a data at time N−1 based on Equation 3.

$$(x_{N-1} - \hat{x}_{N-2}) \tag{3}$$

The encoding device may then perform similar operations as described previously (e.g., divide the differential value for a data given by Equation 3 by $\sqrt{E\{|\Delta|^2\}}$). The decoding device may receive a representation of a data given by $E_P/D_P$ and may multiply the received representation of the data (e.g., encoded version of the data) by $\sqrt{E\{|\Delta|^2\}}$ to generate a reconstructed version of Equation 3 (e.g., $(\widehat{x_{N-1} - \hat{x}_{N-2}})$). The decoding device may then add a reconstructed value for a previous value of the data (e.g., $\hat{x}_{N-2}$) determined by the decoding device to determine and obtain a reconstructed value for the given value of the data at time N−1 (e.g., $\hat{x}_{N-1}$). Additionally or alternatively, the P-frames may be constructed based on $\hat{x}_0$ rather than an immediately preceding reconstruction value for a data.

Accordingly, the decoding device may receive an encoded, quantized, and compressed dataset from the encoding device and may use an entropy decoder 520 and a differential decoder 525 to partially decode the encoded, quantized, and compressed dataset. Additionally, the decoding device may use one or more fully connected layers, one or more convolutional layers, and one or more ResNet blocks as described with reference to FIG. 3A to determine and obtain output 530 corresponding to input 505.

Figure 6:
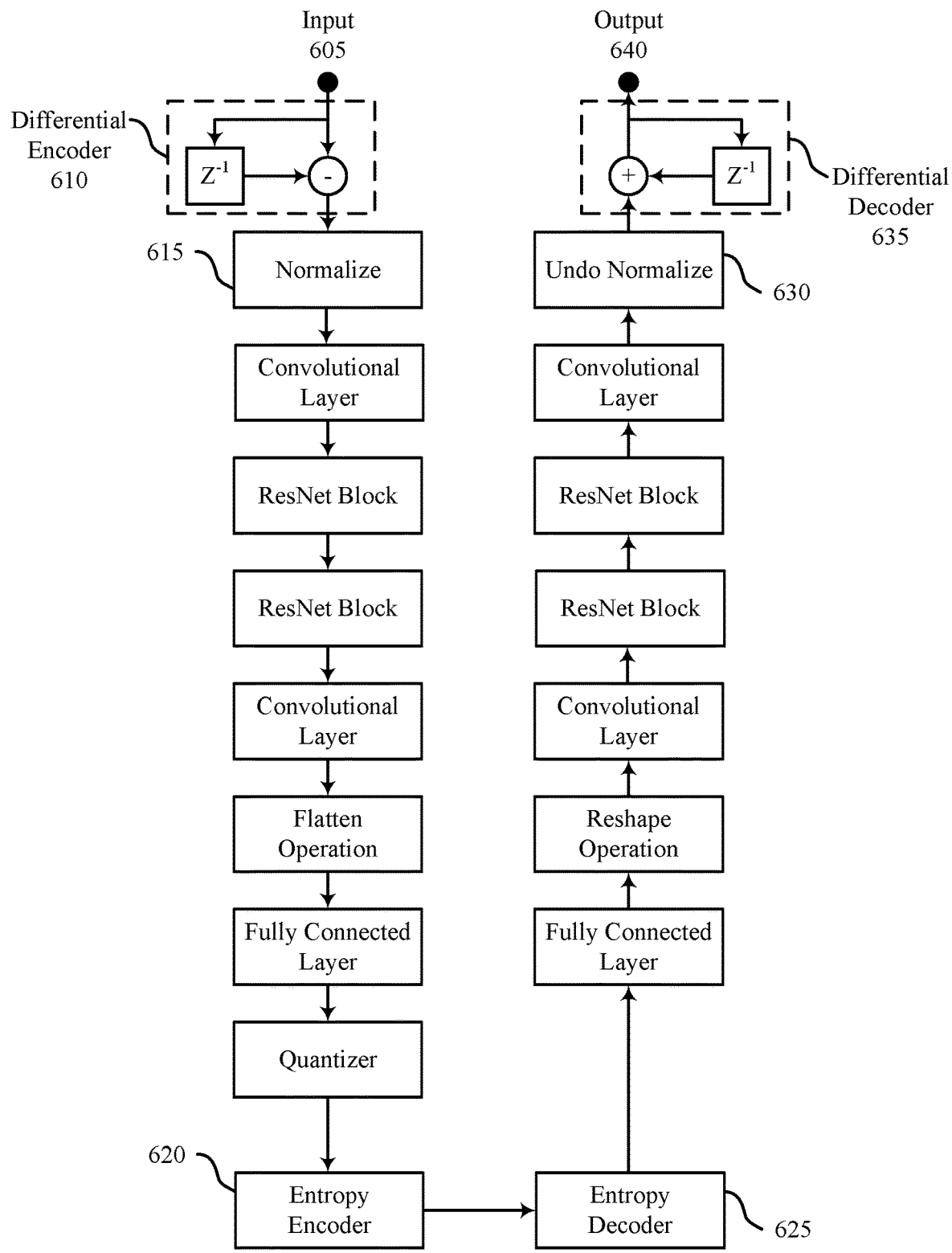
FIG. 6 illustrates an example of a compression and encoding configuration that supports encoding techniques for neural network architectures in accordance with aspects of the present disclosure.

FIG. 6 illustrates an example of a compression and encoding configuration 600 that supports encoding techniques for neural network architectures in accordance with aspects of the present disclosure. In some examples, compression and encoding configuration 600 may implement aspects of or may be implemented by aspects of wireless communications system 100, wireless communications system 200, or both. For example, an encoding device (e.g., a UE 115 or an additional encoding device) may be configured to perform one or more operations on an input 605 of samples (e.g., data) received via one or more antennas of the encoding device to compress the samples. Subsequently, a decoding device (e.g., a base station 105 or an additional decoding device) may be configured to decode the compressed samples to determine an output 640 of information, such as channel state feedback, based on input 605. In some examples, compression and encoding configuration 600 may represent a compression and encoding procedure that includes a differential encoder 610 at an input of an encoder (e.g., single shot encoder, encoder neural network, etc.) and an entropy encoder 620 at an output of the encoder.

With differential encoder 610, the encoding device may use an I-frame and one or more P-frames. The I-frame may occur once every N subframes, and P-frames may occur for the remaining N−1 subframes. In some examples, the encoding device may use two (2) neural networks for the differential encoder 610, such as a first neural network for the I-frame and a second neural network for the P-frame(s). The encoding device may determine an initial value for a data at the I-frame based on the techniques described with reference to FIG. 5 (e.g., $x_0$, divided by $\sqrt{E\{|x_0|^2\}}$, etc.). Subsequently, for each P-frame, a differential value may be determined based on an immediately previous value for the data. For example, for a time N−1, a differential value for the data may be given by Equation 4.

$$(x_{N-1} - x_{N-2}) \tag{4}$$

The decoding device may then determine reconstructed values for each time instance of the data based on this differential value, as described with reference to FIG. 5 (e.g., multiplied by $\sqrt{E\{|\Delta|^2\}}$ and the reconstructed value of the previous value (e.g., $\hat{x}_{N-2}$) to determine a reconstructed value of the data at the time N−1 (e.g., $\hat{x}_{N-1}$). The decoding device (e.g., and/or the encoding device) may then compute a normalized mean square error (NMSE) based on the reconstructed values given by Equation 5.

$$NMSE = \frac{E\{|\hat{x} - x|^2\}}{E\{|x|^2\}} \quad (5)$$

In addition to using or applying differential encoder 610 at the input of the encoder, the encoding device may perform a normalizing operation 615 to normalize the differentially encoded data before further encoding. Additionally, the decoding device may perform an undo normalize operation 630 before using or applying a differential decoder 635. In some examples, the decoding device may also include an entropy decoder 625 that decodes an output of entropy encoder 620.

Figure 7:
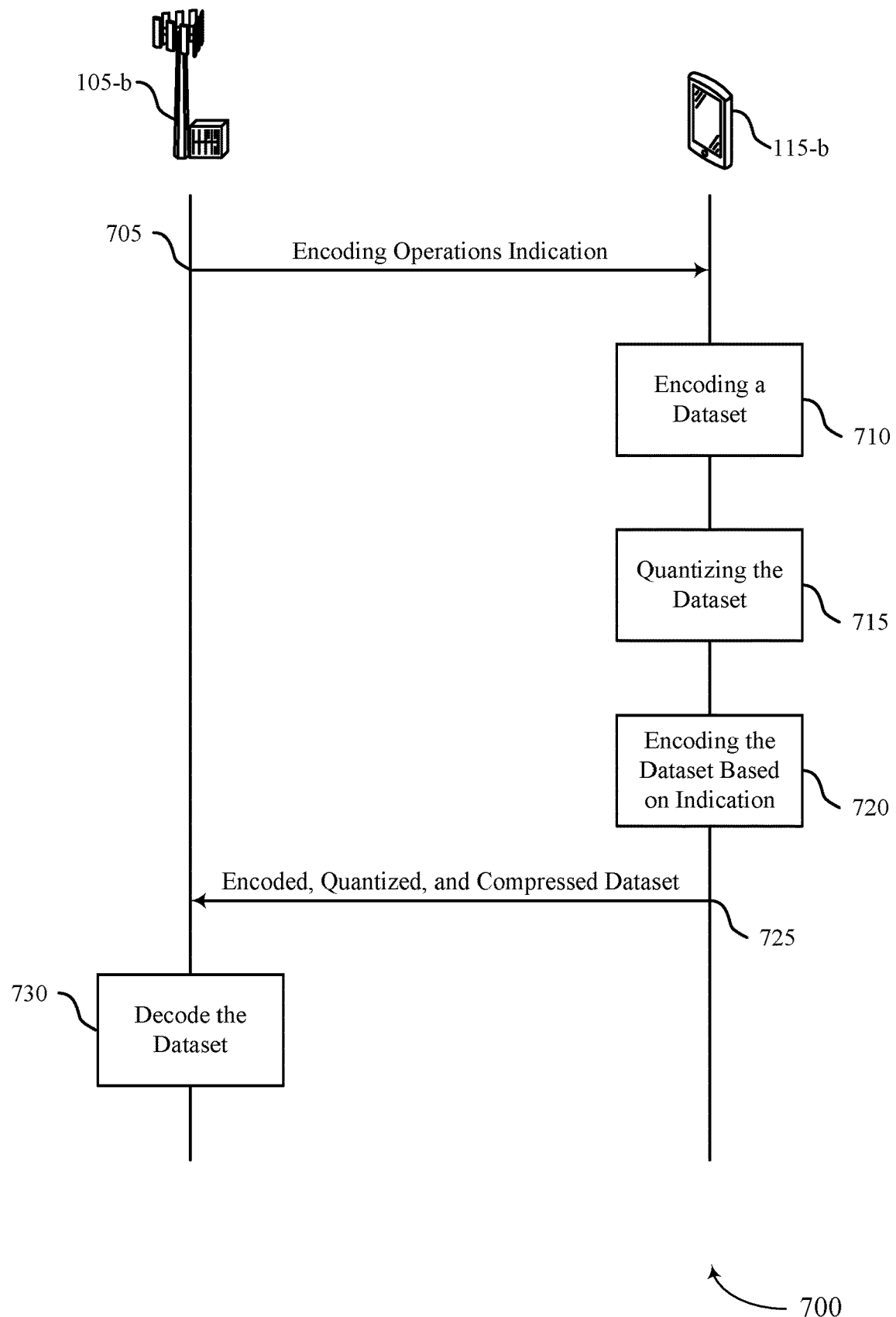
FIG. 7 illustrates an example of a process flow that supports encoding techniques for neural network architectures in accordance with aspects of the present disclosure.

FIG. 7 illustrates an example of a process flow 700 that supports encoding techniques for neural network architectures in accordance with aspects of the present disclosure. In some examples, process flow 700 may implement aspects of or may be implemented by aspects of wireless communications system 100, wireless communications system 200, or both. For example, process flow 700 may include a base station 105-*b* and a UE 115-*b*, which may represent examples of corresponding base stations 105 and UEs 115, respectively, as described with reference to FIGS. 1-6.

In the following description of process flow 700, the operations between UE 115-*b* and base station 105-*b* may be performed in different orders or at different times. Some operations may also be left out of process flow 700, or other operations may be added to process flow 700. While UE 115-*b* and base station 105-*b* are shown performing a quantity of the operations of process flow 700, any wireless device may perform the operations shown.

At 705, UE 115-*b* may receive an indication of one or more encoding operations to use for encoding a compressed dataset, the one or more encoding operations including a differential encoding operation or an entropy encoding operation or both. For example, UE 115-*b* may receive one or more parameters corresponding to the one or more encoding operations, each of the one or more parameters corresponding to a respective encoding operation of the one or more encoding operations, where the quantized and compressed dataset is encoded based on the one or more parameters.

At 710, UE 115-*b* may encode, by a neural network employed at or by UE 115-*b*, a dataset to generate the compressed dataset. At 715, UE 115-*b* may quantize the compressed dataset encoded by the neural network.

At 720, UE 115-*b* may encode the quantized and compressed dataset based on receiving the indication of the one or more encoding operations. In some examples, UE 115-*b* may encode the quantized and compressed dataset using the entropy encoding operation. For example, the entropy encoding operation may include an encoding of the compressed dataset using one or more symbols having lengths that vary based on a probability that a symbol occurs.

Additionally or alternatively, UE 115-*b* may encode the quantized and compressed dataset using the differential encoding operation. For example, the differential encoding operation may include an encoding of an amount of data of the compressed dataset based on previous values for the amount of data. In some examples, UE 115-*b* may determine, after quantizing the compressed dataset encoded by the neural network, a differential value between a first value of a data in the quantized and compressed dataset at a first time instance and a second value of the data at a second time instance after the first time instance, where the differential value is determined based on the indication of the one or more encoding operations (e.g., the indication indicates for UE 115-*b* to use initial values when determining differential values) and the quantized and compressed dataset is encoded based on the differential value. Additionally or alternatively, UE 115-*b* may determine, after quantizing the compressed dataset encoded by the neural network, a differential value between a first reconstruction value of a data in the quantized and compressed dataset at a first time instance and a second reconstruction value of the data at a second time instance after the first time instance, where the differential value is determined based on the indication of the one or more encoding operations (e.g., the indication indicates for UE 115-*b* to use previous reconstructed values when determining differential values) and the quantized and compressed dataset is encoded based on the differential value.

In some examples, when performing the differential encoding operation, UE 115-*b* may determine, after quantizing the compressed dataset encoded by the neural network, an initial reconstruction value for a data in the quantized and compressed dataset at an initial time instance associated with encoding the dataset. Subsequently, UE 115-*b* may determine, after the quantizing, a differential value between an additional reconstruction value of the data at an additional time instance after the initial time instance and the initial reconstruction value for the data, where the differential value is determined based on the indication of the one or more encoding operations (e.g., the indication indicates for UE 115-*b* to use initial reconstructed values when determining differential values) and the quantized and compressed dataset is encoded based on the differential value.

At 725, UE 115-*b* may transmit the encoded, quantized, and compressed dataset (e.g., a compressed and encoded dataset after a single shot encoder) to a second device (e.g., base station 105-*b*) after encoding the compressed dataset based on the one or more encoding operations. In some examples, the encoded, quantized, and compressed dataset may include differential values for data in the dataset that are based on initial values for the data, previous reconstruction values for the data, initial reconstruction values for the data, or a combination thereof.

At 730, base station 105-*b* may decode the encoded, quantized, and compressed dataset received from UE 115-*b*. For example, base station 105-*b* may first decode the encoded, quantized, and compressed dataset to generate a compressed dataset based on the one or more encoding operations. Additionally, base station 105-*b* may then decode, by a neural network (e.g., employed at or by base station 105-*b*), the compressed dataset to generate a dataset based on decoding the encoded, quantized, and compressed dataset.

Figure 8:
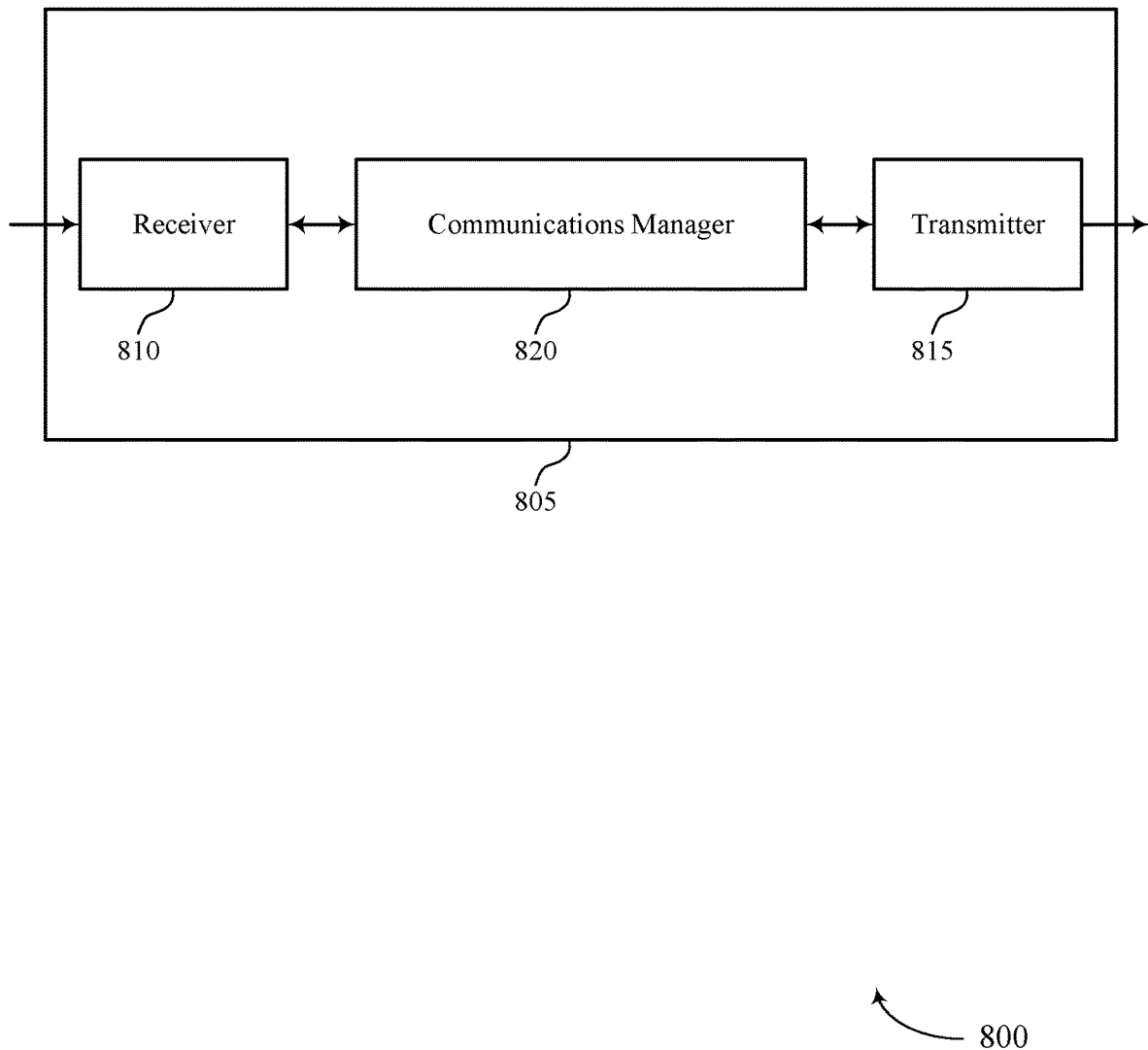
FIGS. 8 and 9 show block diagrams of devices that support encoding techniques for neural network architectures in accordance with aspects of the present disclosure.

FIG. 8 shows a block diagram 800 of a device 805 that supports encoding techniques for neural network architectures in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to encoding techniques for neural network architectures). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to encoding techniques for neural network architectures). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of encoding techniques for neural network architectures as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. For example, the communications manager 820 may be configured as or otherwise support a means for receiving an indication of one or more encoding operations to use for encoding a compressed dataset, the one or more encoding operations including a differential encoding operation or an entropy encoding operation or both. The communications manager 820 may be configured as or otherwise support a means for encoding, by a neural network, a dataset to generate the compressed dataset. The communications manager 820 may be configured as or otherwise support a means for quantizing the compressed dataset encoded by the neural network. The communications manager 820 may be configured as or otherwise support a means for encoding the quantized and compressed dataset based on receiving the indication of the one or more encoding operations. The communications manager 820 may be configured as or otherwise support a means for transmitting the encoded, quantized, and compressed dataset to a second device after encoding the compressed dataset based on the one or more encoding operations.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for more efficient utilization of communication resources. For example, by using the differential encoder operation, the entropy encoder operation, or both, the communications manager 820 may further compress a dataset for transmission to a second device, thereby decreasing signaling overhead and using less communication resources to carry the compressed dataset.

Figure 9:
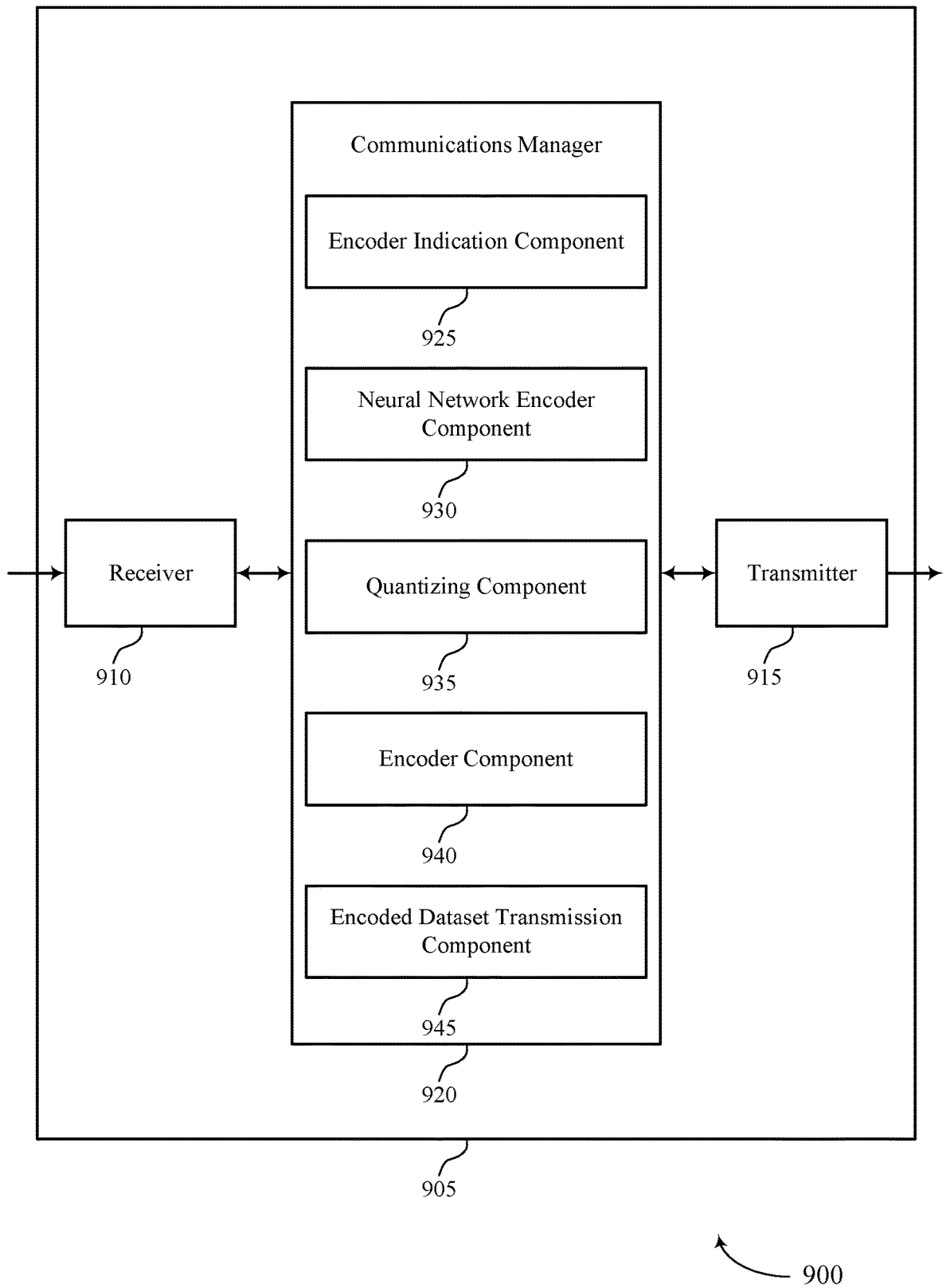

FIG. 9 shows a block diagram 900 of a device 905 that supports encoding techniques for neural network architectures in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to encoding techniques for neural network architectures). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to encoding techniques for neural network architectures). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of encoding techniques for neural network architectures as described herein. For example, the communications manager 920 may include an encoder indication component 925, a neural network encoder component 930, a quantizing component 935, an encoder component 940, an encoded dataset transmission component 945, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. The encoder indication component 925 may be configured as or otherwise support a means for receiving an indication of one or more encoding operations to use for encoding a compressed dataset, the one or more encoding operations including a differential encoding operation or an entropy encoding operation or both. The neural network encoder component 930 may be configured as or otherwise support a means for encoding, by a neural network, a dataset to generate the compressed dataset. The quantizing component 935 may be configured as or otherwise support a means for quantizing the compressed dataset encoded by the neural network. The encoder component 940 may be configured as or otherwise support a means for encoding the quantized and compressed dataset based on receiving the indication of the one or more encoding operations. The encoded dataset transmission component 945 may be configured as or otherwise support a means for transmitting the encoded, quantized, and compressed dataset to a second device after encoding the compressed dataset based on the one or more encoding operations.

Figure 10:
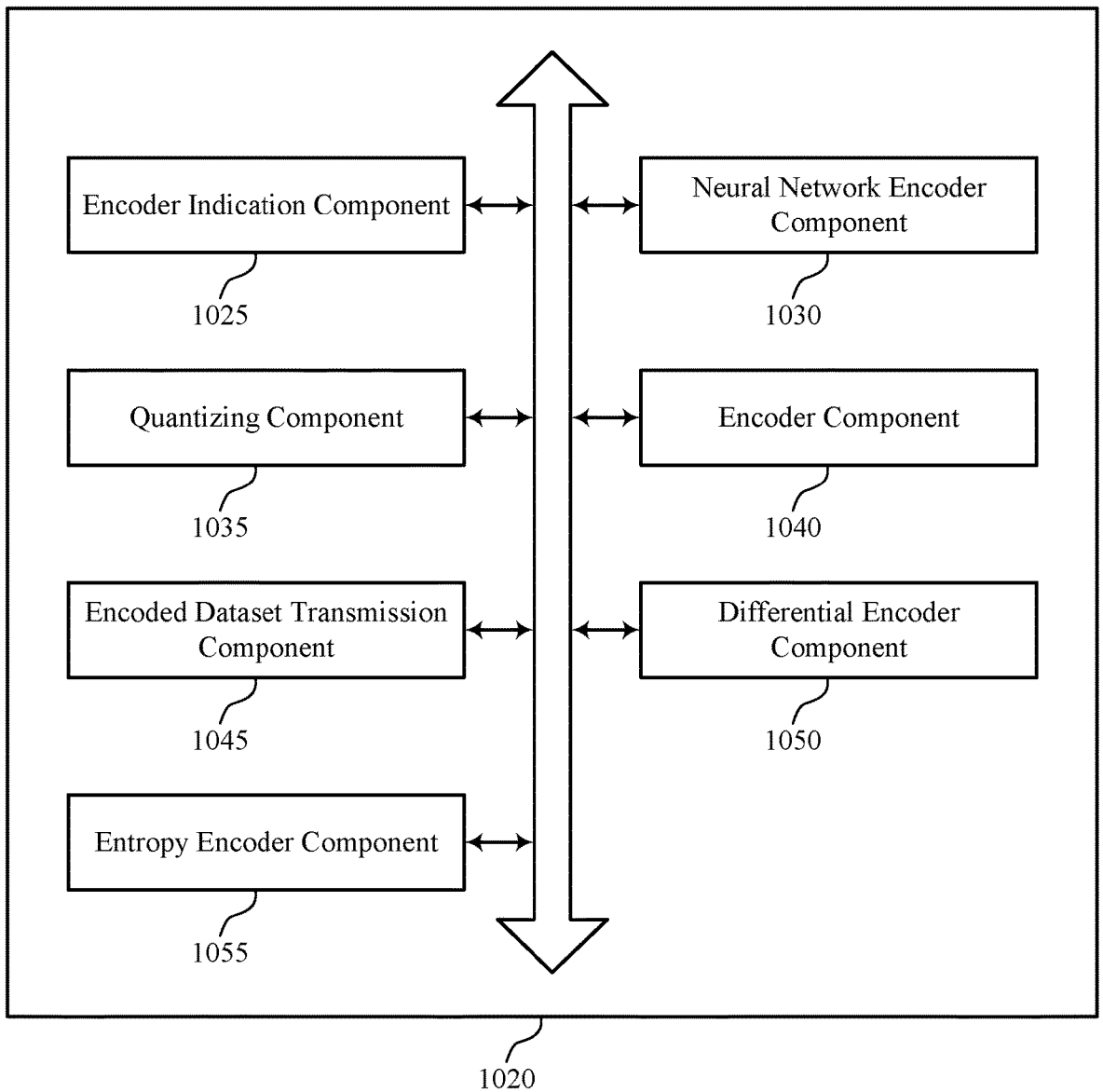
FIG. 10 shows a block diagram of a communications manager that supports encoding techniques for neural network architectures in accordance with aspects of the present disclosure.

FIG. 10 shows a block diagram 1000 of a communications manager 1020 that supports encoding techniques for neural network architectures in accordance with aspects of the present disclosure. The communications manager 1020 may be an example of aspects of a communications manager 820, a communications manager 920, or both, as described herein. The communications manager 1020, or various components thereof, may be an example of means for performing various aspects of encoding techniques for neural network architectures as described herein. For example, the communications manager 1020 may include an encoder indication component 1025, a neural network encoder component 1030, a quantizing component 1035, an encoder component 1040, an encoded dataset transmission component 1045, a differential encoder component 1050, an entropy encoder component 1055, or any combination thereof. Each of these components may communicate, directly or indirectly, with one another (e.g., via one or more buses).

The communications manager 1020 may support wireless communications at a UE in accordance with examples as disclosed herein. The encoder indication component 1025 may be configured as or otherwise support a means for receiving an indication of one or more encoding operations to use for encoding a compressed dataset, the one or more encoding operations including a differential encoding operation or an entropy encoding operation or both. The neural network encoder component 1030 may be configured as or otherwise support a means for encoding, by a neural network, a dataset to generate the compressed dataset. The quantizing component 1035 may be configured as or otherwise support a means for quantizing the compressed dataset encoded by the neural network. The encoder component 1040 may be configured as or otherwise support a means for encoding the quantized and compressed dataset based on receiving the indication of the one or more encoding operations. The encoded dataset transmission component 1045 may be configured as or otherwise support a means for transmitting the encoded, quantized, and compressed dataset to a second device after encoding the compressed dataset based on the one or more encoding operations.

In some examples, to support receiving the indication of the one or more encoding operations, the encoder indication component 1025 may be configured as or otherwise support a means for receiving one or more parameters corresponding to the one or more encoding operations, each of the one or more parameters corresponding to a respective encoding operation of the one or more encoding operations, where the quantized and compressed dataset is encoded based on the one or more parameters.

In some examples, to support encoding the quantized and compressed dataset, the differential encoder component 1050 may be configured as or otherwise support a means for encoding the quantized and compressed dataset using the differential encoding operation after encoding the dataset using the neural network.

In some examples, to support encoding the quantized and compressed dataset, the entropy encoder component 1055 may be configured as or otherwise support a means for encoding the quantized and compressed dataset using the entropy encoding operation after encoding the dataset using the neural network.

In some examples, to support encoding the quantized and compressed dataset, the differential encoder component 1050 may be configured as or otherwise support a means for determining, after quantizing the compressed dataset encoded by the neural network, a differential value between a first value of a data in the quantized and compressed dataset at an initial time instance and a second value of the data at a second time instance after the initial time instance, where the differential value is determined based on the indication of the one or more encoding operations and the quantized and compressed dataset is encoded based on the differential value.

In some examples, to support encoding the quantized and compressed dataset, the differential encoder component 1050 may be configured as or otherwise support a means for determining, after quantizing the compressed dataset encoded by the neural network, a differential value between a first reconstruction value of a data in the quantized and compressed dataset at a first time instance and a second reconstruction value of the data at a second time instance after the first time instance, where the differential value is determined based on the indication of the one or more encoding operations and the quantized and compressed dataset is encoded based on the differential value.

In some examples, to support encoding the quantized and compressed dataset, the differential encoder component 1050 may be configured as or otherwise support a means for determining, after quantizing the compressed dataset encoded by the neural network, an initial reconstruction value for a data in the quantized and compressed dataset at an initial time instance associated with encoding the dataset. In some examples, to support encoding the quantized and compressed dataset, the differential encoder component 1050 may be configured as or otherwise support a means for determining, after the quantizing, a differential value between an additional reconstruction value of the data at an additional time instance after the initial time instance and the initial reconstruction value for the data, where the differential value is determined based on the indication of the one or more encoding operations and the quantized and compressed dataset is encoded based on the differential value.

In some examples, the differential encoding operation includes an encoding of an amount of data of the compressed dataset based on previous values for the amount of data.

In some examples, the entropy encoding operation includes an encoding of the compressed dataset using one or more symbols having lengths that vary based on a probability that a symbol occurs.

Figure 11:
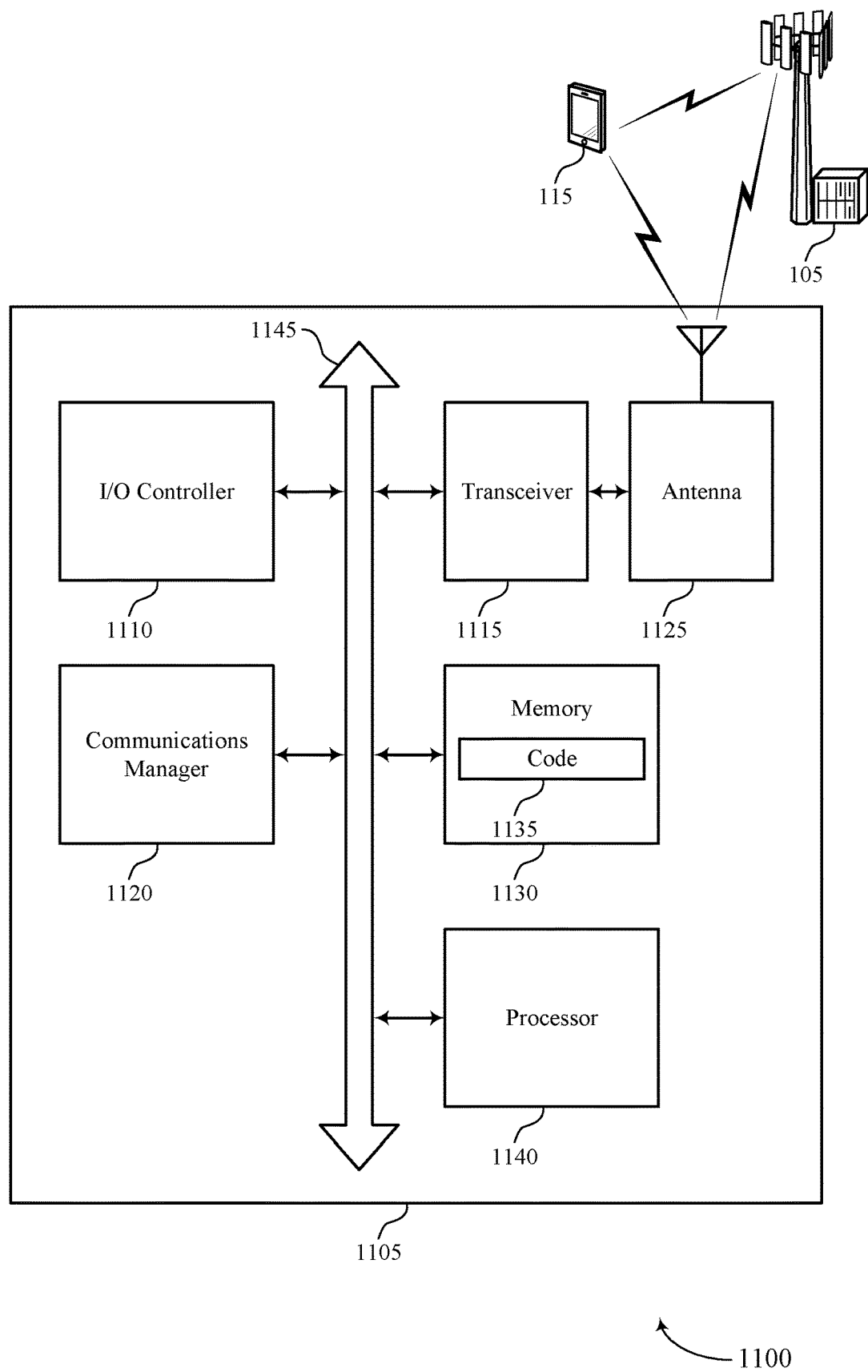
FIG. 11 shows a diagram of a system including a device that supports encoding techniques for neural network architectures in accordance with aspects of the present disclosure.

FIG. 11 shows a diagram of a system 1100 including a device 1105 that supports encoding techniques for neural network architectures in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting encoding techniques for neural network architectures). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for receiving an indication of one or more encoding operations to use for encoding a compressed dataset, the one or more encoding operations including a differential encoding operation or an entropy encoding operation or both. The communications manager 1120 may be configured as or otherwise support a means for encoding, by a neural network, a dataset to generate the compressed dataset. The communications manager 1120 may be configured as or otherwise support a means for quantizing the compressed dataset encoded by the neural network. The communications manager 1120 may be configured as or otherwise support a means for encoding the quantized and compressed dataset based on receiving the indication of the one or more encoding operations. The communications manager 1120 may be configured as or otherwise support a means for transmitting the encoded, quantized, and compressed dataset to a second device after encoding the compressed dataset based on the one or more encoding operations.

By including or configuring the communications manager 1120 in accordance with examples as described herein, the device 1105 may support techniques for more efficient utilization of communication resources, improved coordination between devices, and improved utilization of processing capability. For example, by using the differential encoder operation, the entropy encoder operation, or both, the communications manager 1120 may further compress a dataset for transmission to a second device, thereby decreasing signaling overhead and using less communication resources to carry the compressed dataset. Additionally, by receiving indications of parameters for the different encoder operations from a network device, the communications manager 1120 may support coordination between device 1105 and the network device. Using the differential encoder operation, the entropy encoder operation, or both may also use more of the processing capability of device 1105 rather than performing less encoding operations that would result in less compressed data than would have been achieved without the differential encoder operation and the entropy encoder operation.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of encoding techniques for neural network architectures as described herein, or the processor 1140 and the memory 1130 may be otherwise configured to perform or support such operations.

Figure 12:
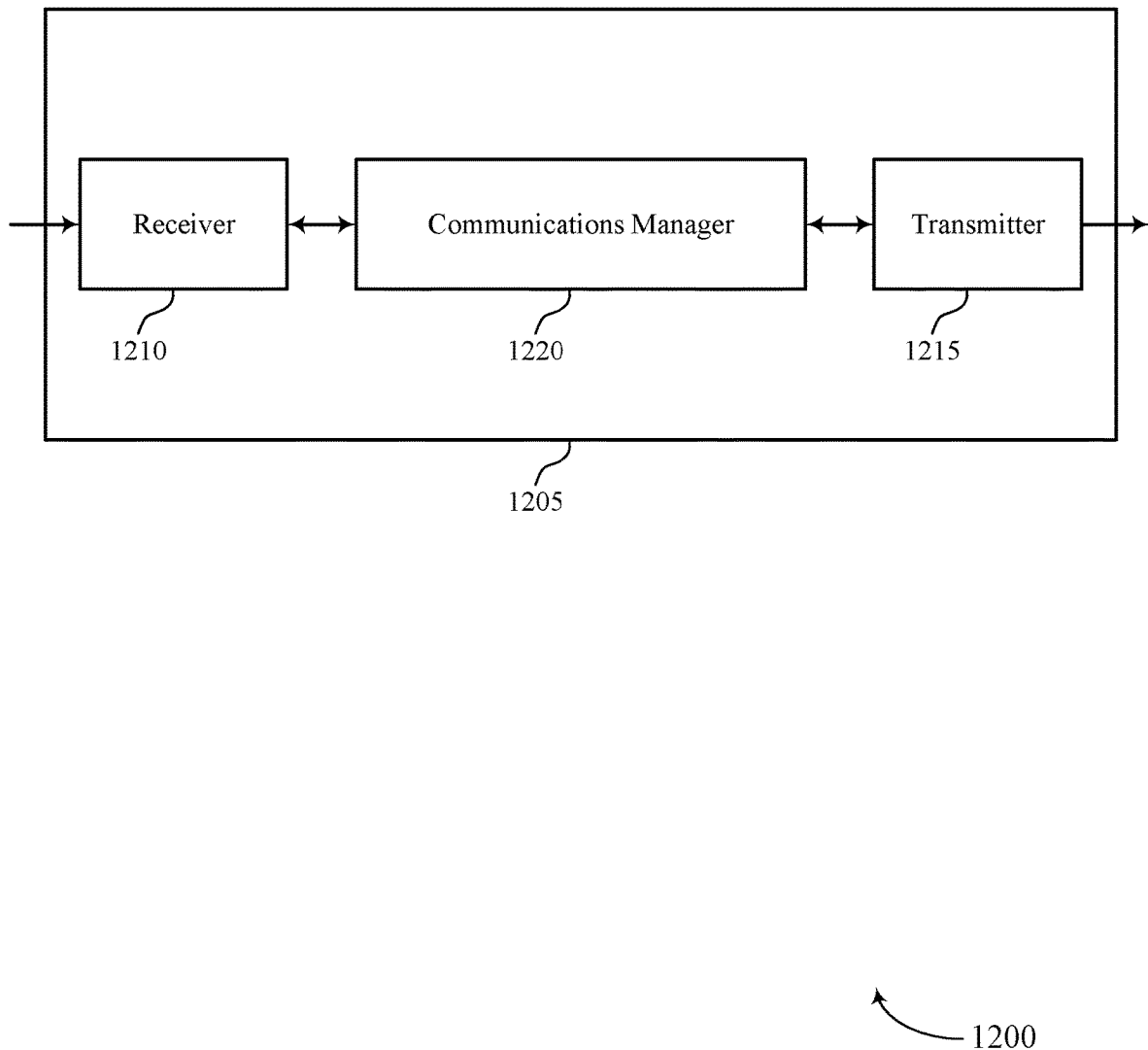
FIGS. 12 and 13 show block diagrams of devices that support encoding techniques for neural network architectures in accordance with aspects of the present disclosure.

FIG. 12 shows a block diagram 1200 of a device 1205 that supports encoding techniques for neural network architectures in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to encoding techniques for neural network architectures). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to encoding techniques for neural network architectures). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of encoding techniques for neural network architectures as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a device in accordance with examples as disclosed herein. For example, the communications manager 1220 may be configured as or otherwise support a means for transmitting, to a UE, an indication of one or more encoding operations for the UE to use for encoding a compressed dataset, the one or more encoding operations including a differential encoding operation or an entropy encoding operation or both. The communications manager 1220 may be configured as or otherwise support a means for receiving, from the UE, an encoded, quantized, and compressed dataset after the compressed dataset has been encoded following a quantization operation based on the one or more encoding operations. The communications manager 1220 may be configured as or otherwise support a means for decoding, basing at least in part on the one or more encoding operations, the encoded, quantized, and compressed dataset to generate a compressed dataset. The communications manager 1220 may be configured as or otherwise support a means for decoding, by a neural network, the compressed dataset to generate a dataset based on decoding the encoded, quantized, and compressed dataset.

Figure 13:
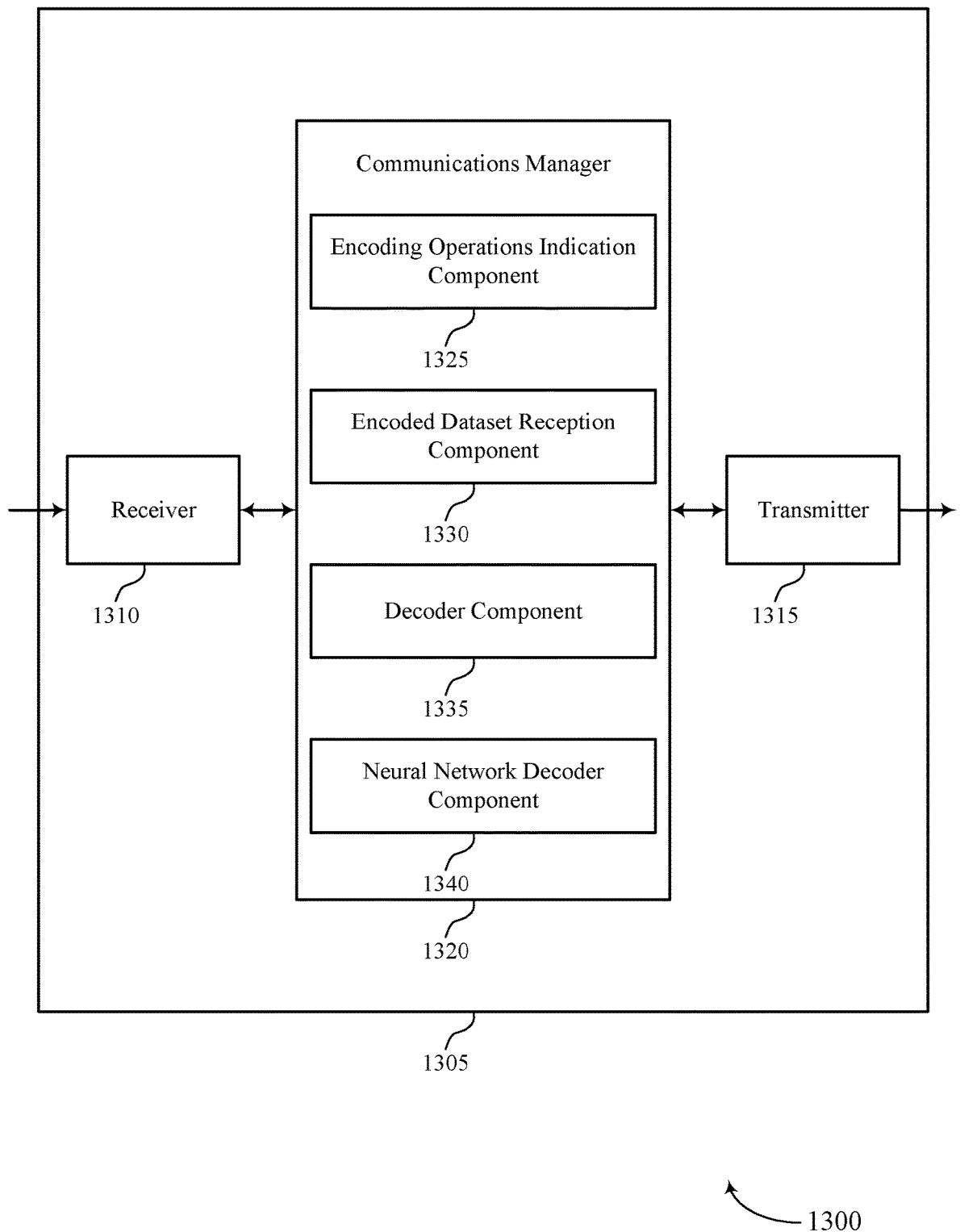

FIG. 13 shows a block diagram 1300 of a device 1305 that supports encoding techniques for neural network architectures in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to encoding techniques for neural network architectures). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to encoding techniques for neural network architectures). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of encoding techniques for neural network architectures as described herein. For example, the communications manager 1320 may include an encoding operations indication component 1325, an encoded dataset reception component 1330, a decoder component 1335, a neural network decoder component 1340, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a device in accordance with examples as disclosed herein. The encoding operations indication component 1325 may be configured as or otherwise support a means for transmitting, to a UE, an indication of one or more encoding operations for the UE to use for encoding a compressed dataset, the one or more encoding operations including a differential encoding operation or an entropy encoding operation or both. The encoded dataset reception component 1330 may be configured as or otherwise support a means for receiving, from the UE, an encoded, quantized, and compressed dataset after the compressed dataset has been encoded following a quantization operation based on the one or more encoding operations. The decoder component 1335 may be configured as or otherwise support a means for decoding, based on the one or more encoding operations, the encoded, quantized, and compressed dataset to generate a compressed dataset. The neural network decoder component 1340 may be configured as or otherwise support a means for decoding, by a neural network, the compressed dataset to generate a dataset based on decoding the encoded, quantized, and compressed dataset.

Figure 14:
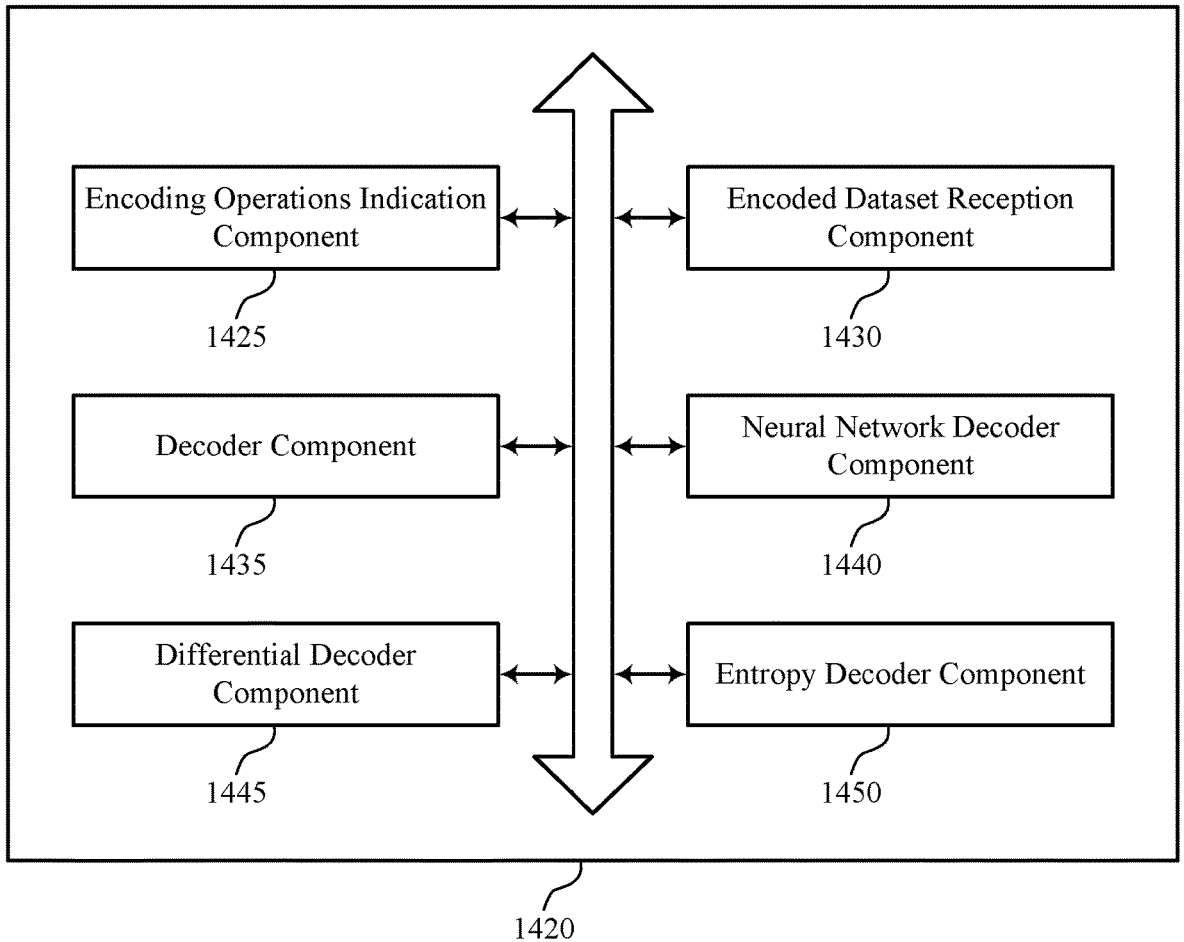
FIG. 14 shows a block diagram of a communications manager that supports encoding techniques for neural network architectures in accordance with aspects of the present disclosure.

FIG. 14 shows a block diagram 1400 of a communications manager 1420 that supports encoding techniques for neural network architectures in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of encoding techniques for neural network architectures as described herein. For example, the communications manager 1420 may include an encoding operations indication component 1425, an encoded dataset reception component 1430, a decoder component 1435, a neural network decoder component 1440, a differential decoder component 1445, an entropy decoder component 1450, or any combination thereof. Each of these components may communicate, directly or indirectly, with one another (e.g., via one or more buses).

The communications manager 1420 may support wireless communications at a device in accordance with examples as disclosed herein. The encoding operations indication component 1425 may be configured as or otherwise support a means for transmitting, to a UE, an indication of one or more encoding operations for the UE to use for encoding a compressed dataset, the one or more encoding operations including a differential encoding operation or an entropy encoding operation or both. The encoded dataset reception component 1430 may be configured as or otherwise support a means for receiving, from the UE, an encoded, quantized, and compressed dataset after the compressed dataset has been encoded following a quantization operation based on the one or more encoding operations. The decoder component 1435 may be configured as or otherwise support a means for decoding, based on the one or more encoding operations, the encoded, quantized, and compressed dataset to generate a compressed dataset. The neural network decoder component 1440 may be configured as or otherwise support a means for decoding, by a neural network, the compressed dataset to generate a dataset based on decoding the encoded, quantized, and compressed dataset.

In some examples, to support transmitting the indication of the one or more encoding operations, the encoding operations indication component 1425 may be configured as or otherwise support a means for transmitting one or more parameters corresponding to the one or more encoding operations, each of the one or more parameters corresponding to a respective encoding operation of the one or more encoding operations, where the quantized and compressed dataset is encoded based on the one or more parameters.

In some examples, to support decoding the encoded, quantized, and compressed dataset, the differential decoder component 1445 may be configured as or otherwise support a means for decoding the encoded, quantized, and compressed dataset using a differential decoding operation.

In some examples, to support decoding the encoded, quantized, and compressed dataset, the entropy decoder component 1450 may be configured as or otherwise support a means for decoding the encoded, quantized, and compressed dataset using an entropy decoding operation.

In some examples, to support receiving the encoded, quantized, and compressed dataset, the differential decoder component 1445 may be configured as or otherwise support a means for receiving the encoded, quantized, and compressed dataset including differential values for data in the dataset that are based on initial values for the data.

In some examples, to support receiving the encoded, quantized, and compressed dataset, the differential decoder component 1445 may be configured as or otherwise support a means for receiving the encoded, quantized, and compressed dataset including differential values for data in the dataset that are based on previous reconstruction values for the data.

In some examples, to support receiving the encoded, quantized, and compressed dataset, the differential decoder component 1445 may be configured as or otherwise support a means for receiving the encoded, quantized, and compressed dataset including differential values for data in the dataset that are based on initial reconstruction values for the data.

In some examples, the differential decoding operation includes an encoding of an amount of data of the compressed dataset based on previous values for the amount of data.

In some examples, the entropy decoding operation includes an encoding of the compressed dataset using one or more symbols having lengths that vary based on a probability that a symbol occurs.

Figure 15:
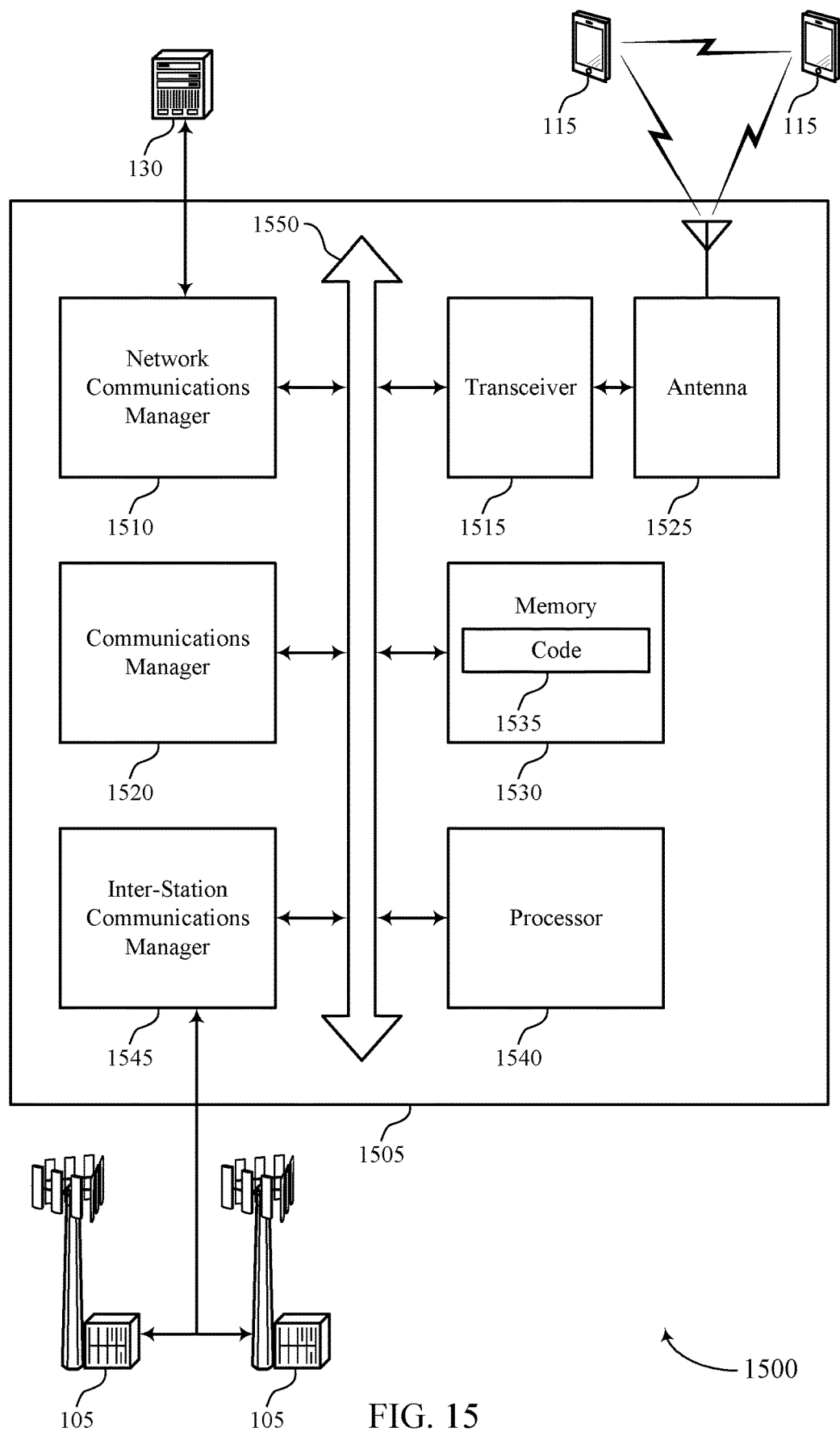
FIG. 15 shows a diagram of a system including a device that supports encoding techniques for neural network architectures in accordance with aspects of the present disclosure.

FIG. 15 shows a diagram of a system 1500 including a device 1505 that supports encoding techniques for neural network architectures in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting encoding techniques for neural network architectures). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communications at a device in accordance with examples as disclosed herein. For example, the communications manager 1520 may be configured as or otherwise support a means for transmitting, to a UE, an indication of one or more encoding operations for the UE to use for encoding a compressed dataset, the one or more encoding operations including a differential encoding operation or an entropy encoding operation or both. The communications manager 1520 may be configured as or otherwise support a means for receiving, from the UE, an encoded, quantized, and compressed dataset after the compressed dataset has been encoded following a quantization operation based on the one or more encoding operations. The communications manager 1520 may be configured as or otherwise support a means for decoding, basing at least in part on the one or more encoding operations, the encoded, quantized, and compressed dataset to generate a compressed dataset. The communications manager 1520 may be configured as or otherwise support a means for decoding, by a neural network, the compressed dataset to generate a dataset based on decoding the encoded, quantized, and compressed dataset.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of encoding techniques for neural network architectures as described herein, or the processor 1540 and the memory 1530 may be otherwise configured to perform or support such operations.

Figure 16:
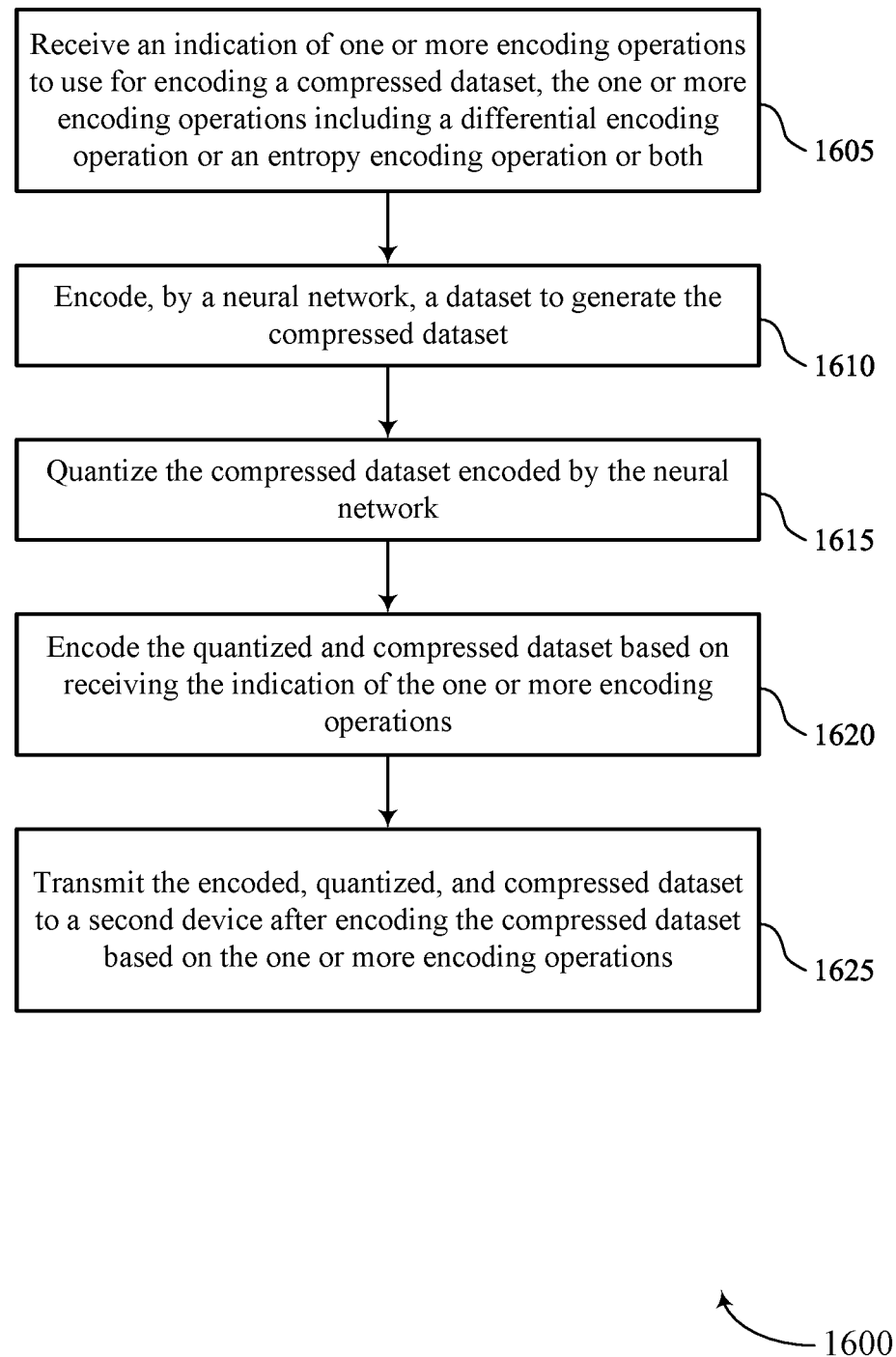
FIGS. 16 through 20 show flowcharts illustrating methods that support encoding techniques for neural network architectures in accordance with aspects of the present disclosure.

FIG. 16 shows a flowchart illustrating a method 1600 that supports encoding techniques for neural network architectures in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include receiving an indication of one or more encoding operations to use for encoding a compressed dataset, the one or more encoding operations including a differential encoding operation or an entropy encoding operation or both. The operations of 1605 may be performed in accordance with examples as disclosed herein. In some examples, aspects of the operations of 1605 may be performed by an encoder indication component 1025 as described with reference to FIG. 10.

At 1610, the method may include encoding, by a neural network, a dataset to generate the compressed dataset. The operations of 1610 may be performed in accordance with examples as disclosed herein. In some examples, aspects of the operations of 1610 may be performed by a neural network encoder component 1030 as described with reference to FIG. 10.

At 1615, the method may include quantizing the compressed dataset encoded by the neural network. The operations of 1615 may be performed in accordance with examples as disclosed herein. In some examples, aspects of the operations of 1615 may be performed by a quantizing component 1035 as described with reference to FIG. 10.

At 1620, the method may include encoding the quantized and compressed dataset based on receiving the indication of the one or more encoding operations. The operations of 1620 may be performed in accordance with examples as disclosed herein. In some examples, aspects of the operations of 1620 may be performed by an encoder component 1040 as described with reference to FIG. 10.

At 1625, the method may include transmitting the encoded, quantized, and compressed dataset to a second device after encoding the compressed dataset based on the one or more encoding operations. The operations of 1625 may be performed in accordance with examples as disclosed herein. In some examples, aspects of the operations of 1625 may be performed by an encoded dataset transmission component 1045 as described with reference to FIG. 10.

Figure 17:
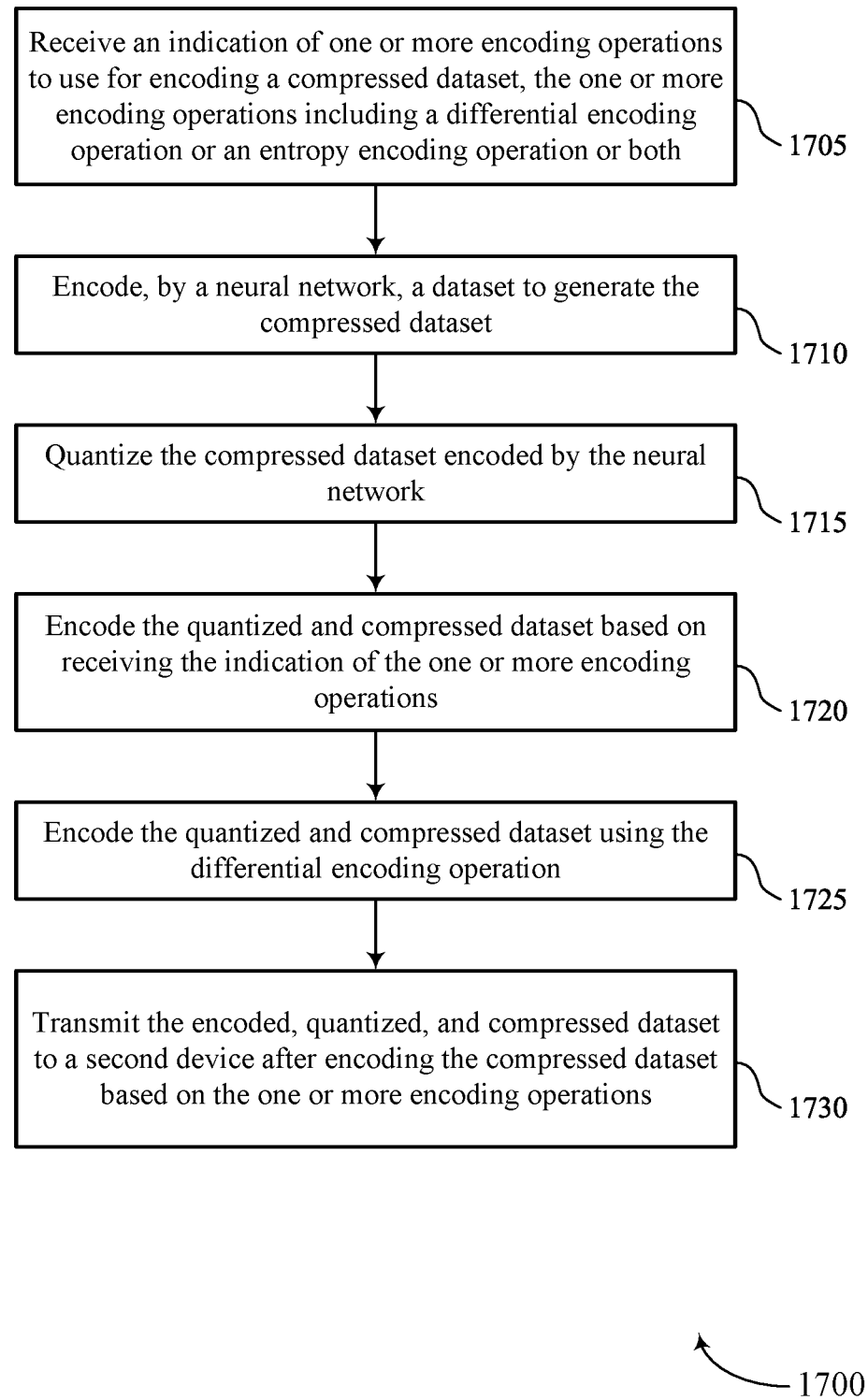

FIG. 17 shows a flowchart illustrating a method 1700 that supports encoding techniques for neural network architectures in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include receiving an indication of one or more encoding operations to use for encoding a compressed dataset, the one or more encoding operations including a differential encoding operation or an entropy encoding operation or both. The operations of 1705 may be performed in accordance with examples as disclosed herein. In some examples, aspects of the operations of 1705 may be performed by an encoder indication component 1025 as described with reference to FIG. 10.

At 1710, the method may include encoding, by a neural network, a dataset to generate the compressed dataset. The operations of 1710 may be performed in accordance with examples as disclosed herein. In some examples, aspects of the operations of 1710 may be performed by a neural network encoder component 1030 as described with reference to FIG. 10.

At 1715, the method may include quantizing the compressed dataset encoded by the neural network. The operations of 1715 may be performed in accordance with examples as disclosed herein. In some examples, aspects of the operations of 1715 may be performed by a quantizing component 1035 as described with reference to FIG. 10.

At 1720, the method may include encoding the quantized and compressed dataset based on receiving the indication of the one or more encoding operations. The operations of 1720 may be performed in accordance with examples as disclosed herein. In some examples, aspects of the operations of 1720 may be performed by an encoder component 1040 as described with reference to FIG. 10.

At 1725, the method may include encoding the quantized and compressed dataset using the differential encoding operation. The operations of 1725 may be performed in accordance with examples as disclosed herein. In some examples, aspects of the operations of 1725 may be performed by a differential encoder component 1050 as described with reference to FIG. 10.

At 1730, the method may include transmitting the encoded, quantized, and compressed dataset to a second device after encoding the compressed dataset based on the one or more encoding operations. The operations of 1730 may be performed in accordance with examples as disclosed herein. In some examples, aspects of the operations of 1730 may be performed by an encoded dataset transmission component 1045 as described with reference to FIG. 10.

Figure 18:
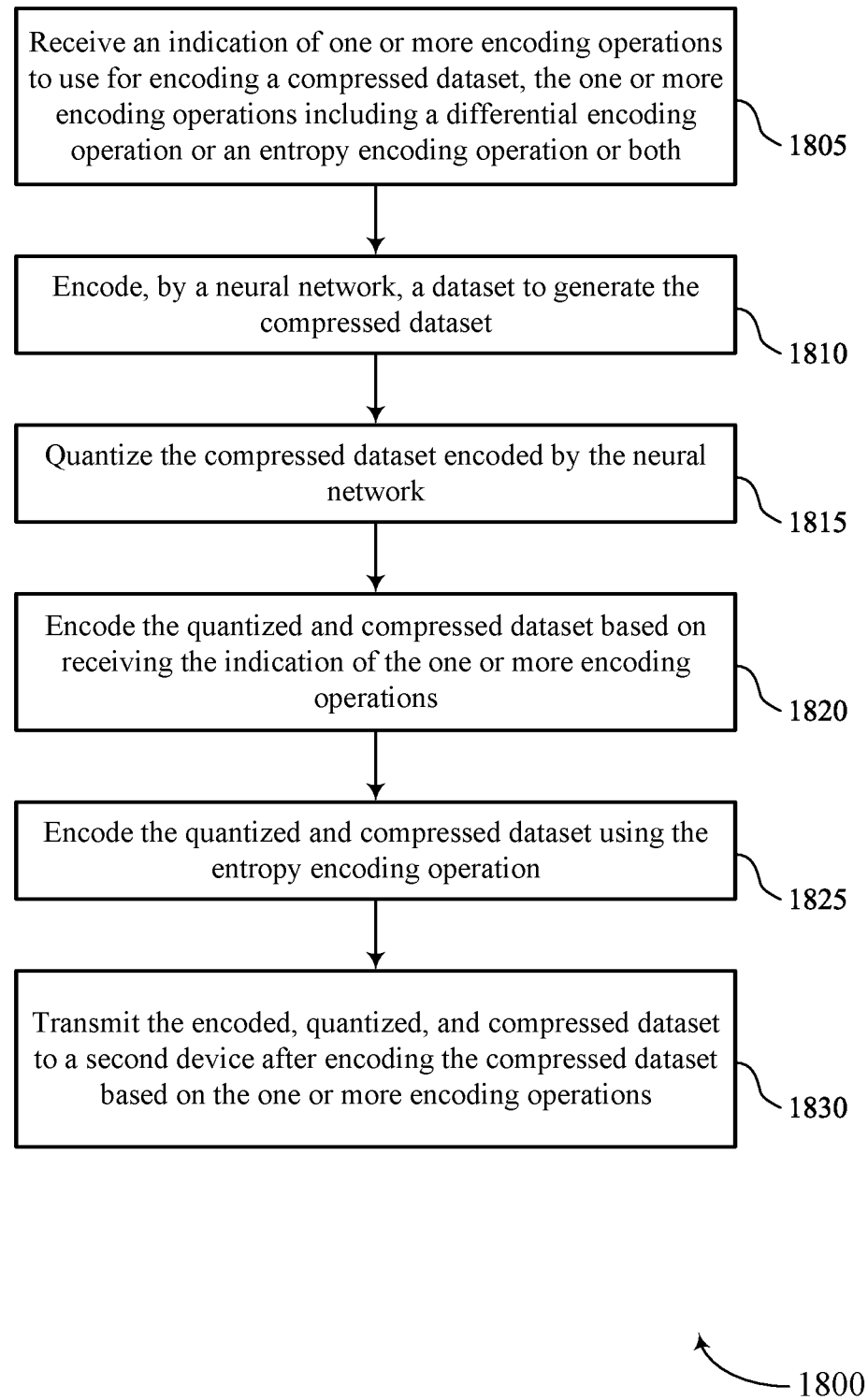

FIG. 18 shows a flowchart illustrating a method 1800 that supports encoding techniques for neural network architectures in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1805, the method may include receiving an indication of one or more encoding operations to use for encoding a compressed dataset, the one or more encoding operations including a differential encoding operation or an entropy encoding operation or both. The operations of 1805 may be performed in accordance with examples as disclosed herein. In some examples, aspects of the operations of 1805 may be performed by an encoder indication component 1025 as described with reference to FIG. 10.

At 1810, the method may include encoding, by a neural network, a dataset to generate the compressed dataset. The operations of 1810 may be performed in accordance with examples as disclosed herein. In some examples, aspects of the operations of 1810 may be performed by a neural network encoder component 1030 as described with reference to FIG. 10.

At 1815, the method may include quantizing the compressed dataset encoded by the neural network. The operations of 1815 may be performed in accordance with examples as disclosed herein. In some examples, aspects of the operations of 1815 may be performed by a quantizing component 1035 as described with reference to FIG. 10.

At 1820, the method may include encoding the quantized and compressed dataset based on receiving the indication of the one or more encoding operations. The operations of 1820 may be performed in accordance with examples as disclosed herein. In some examples, aspects of the operations of 1820 may be performed by an encoder component 1040 as described with reference to FIG. 10.

At 1825, the method may include encoding the quantized and compressed dataset using the entropy encoding operation. The operations of 1825 may be performed in accordance with examples as disclosed herein. In some examples, aspects of the operations of 1825 may be performed by an entropy encoder component 1055 as described with reference to FIG. 10.

At 1830, the method may include transmitting the encoded, quantized, and compressed dataset to a second device after encoding the compressed dataset based on the one or more encoding operations. The operations of 1830 may be performed in accordance with examples as disclosed herein. In some examples, aspects of the operations of 1830 may be performed by an encoded dataset transmission component 1045 as described with reference to FIG. 10.

Figure 19:
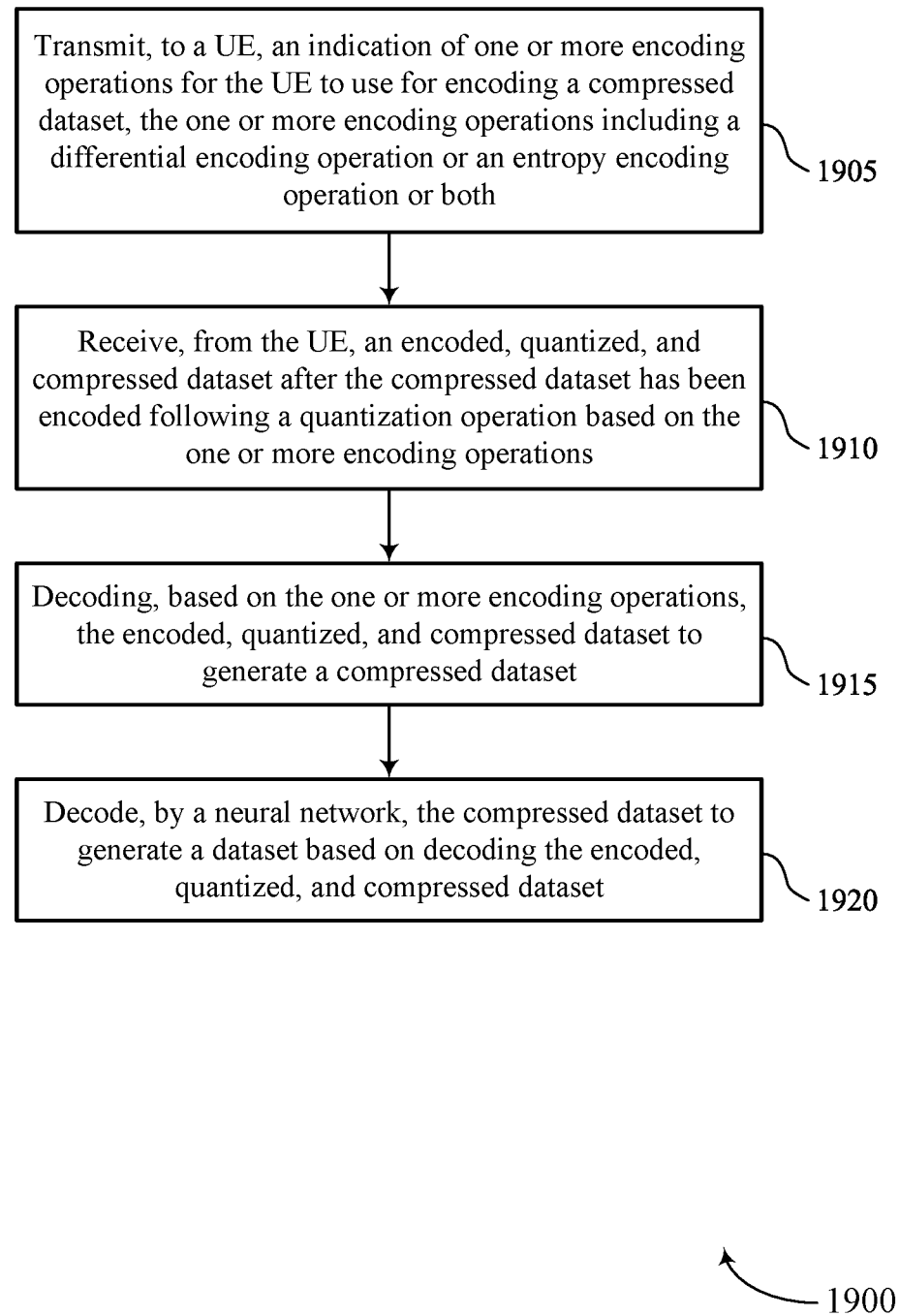

FIG. 19 shows a flowchart illustrating a method 1900 that supports encoding techniques for neural network architectures in accordance with aspects of the present disclosure. The operations of the method 1900 may be implemented by a base station or its components as described herein. For example, the operations of the method 1900 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, an indication of one or more encoding operations for the UE to use for encoding a compressed dataset, the one or more encoding operations including a differential encoding operation or an entropy encoding operation or both. The operations of 1905 may be performed in accordance with examples as disclosed herein. In some examples, aspects of the operations of 1905 may be performed by an encoding operations indication component 1425 as described with reference to FIG. 14.

At 1910, the method may include receiving, from the UE, an encoded, quantized, and compressed dataset after the compressed dataset has been encoded following a quantization operation based on the one or more encoding operations. The operations of 1910 may be performed in accordance with examples as disclosed herein. In some examples, aspects of the operations of 1910 may be performed by an encoded dataset reception component 1430 as described with reference to FIG. 14.

At 1915, the method may include decoding, based on the one or more encoding operations, the encoded, quantized, and compressed dataset to generate a compressed dataset. The operations of 1915 may be performed in accordance with examples as disclosed herein. In some examples, aspects of the operations of 1915 may be performed by a decoder component 1435 as described with reference to FIG. 14.

At 1920, the method may include decoding, by a neural network, the compressed dataset to generate a dataset based on decoding the encoded, quantized, and compressed dataset. The operations of 1920 may be performed in accordance with examples as disclosed herein. In some examples, aspects of the operations of 1920 may be performed by a neural network decoder component 1440 as described with reference to FIG. 14.

Figure 20:
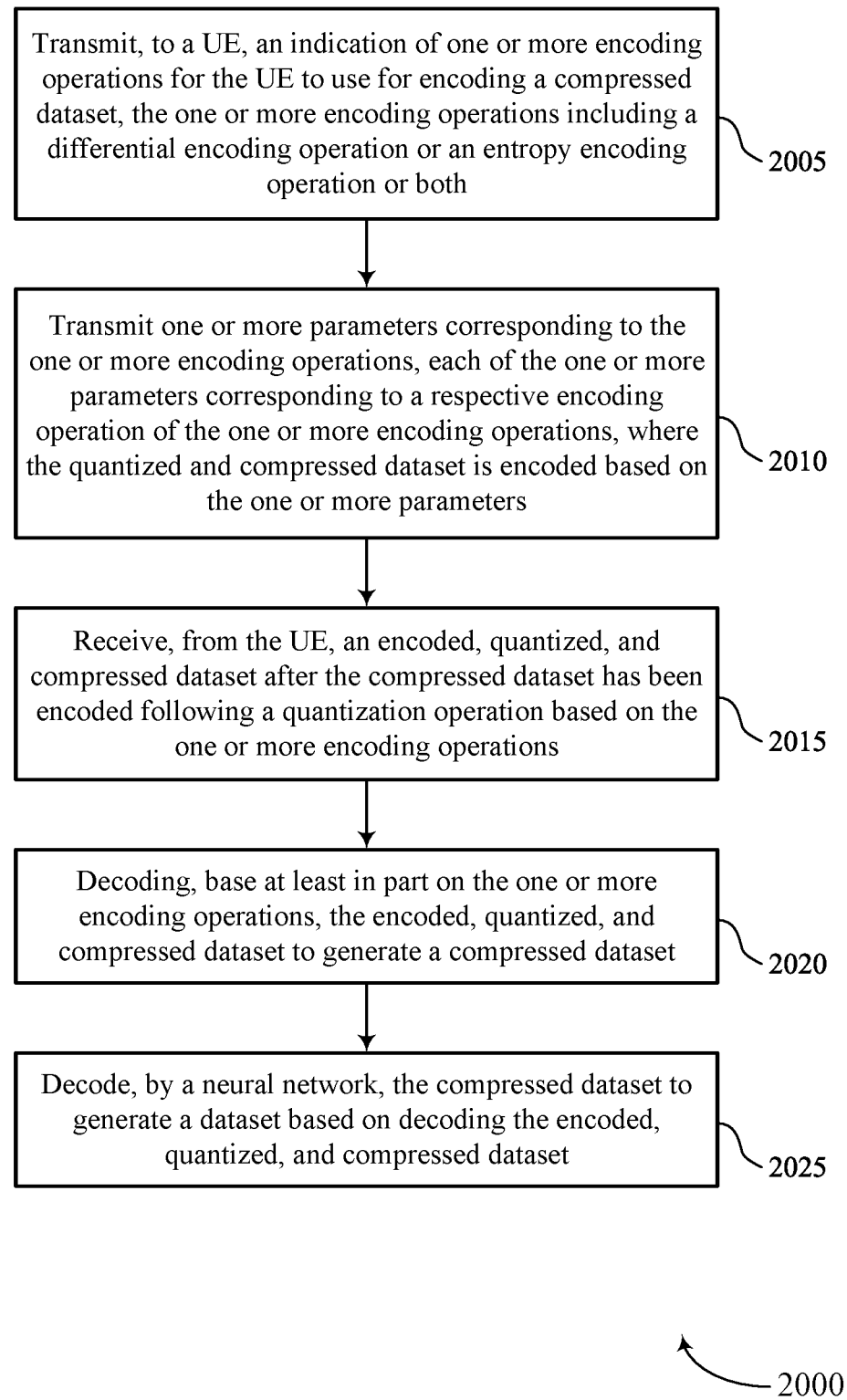

FIG. 20 shows a flowchart illustrating a method 2000 that supports encoding techniques for neural network architectures in accordance with aspects of the present disclosure. The operations of the method 2000 may be implemented by a base station or its components as described herein. For example, the operations of the method 2000 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, an indication of one or more encoding operations for the UE to use for encoding a compressed dataset, the one or more encoding operations including a differential encoding operation or an entropy encoding operation or both. The operations of 2005 may be performed in accordance with examples as disclosed herein. In some examples, aspects of the operations of 2005 may be performed by an encoding operations indication component 1425 as described with reference to FIG. 14.

At 2010, the method may include transmitting one or more parameters corresponding to the one or more encoding operations, each of the one or more parameters corresponding to a respective encoding operation of the one or more encoding operations, where the quantized and compressed dataset is encoded based on the one or more parameters. The operations of 2010 may be performed in accordance with examples as disclosed herein. In some examples, aspects of the operations of 2010 may be performed by an encoding operations indication component 1425 as described with reference to FIG. 14.

At 2015, the method may include receiving, from the UE, an encoded, quantized, and compressed dataset after the compressed dataset has been encoded following a quantization operation based on the one or more encoding operations. The operations of 2015 may be performed in accordance with examples as disclosed herein. In some examples, aspects of the operations of 2015 may be performed by an encoded dataset reception component 1430 as described with reference to FIG. 14.

At 2020, the method may include decoding, based on the one or more encoding operations, the encoded, quantized, and compressed dataset to generate a compressed dataset. The operations of 2020 may be performed in accordance with examples as disclosed herein. In some examples, aspects of the operations of 2020 may be performed by a decoder component 1435 as described with reference to FIG. 14.

At 2025, the method may include decoding, by a neural network, the compressed dataset to generate a dataset based on decoding the encoded, quantized, and compressed dataset. The operations of 2025 may be performed in accordance with examples as disclosed herein. In some examples, aspects of the operations of 2025 may be performed by a neural network decoder component 1440 as described with reference to FIG. 14.

The following provides an overview of aspects of the present disclosure:

Aspect 1: A method for wireless communications at a UE, comprising: receiving an indication of one or more encoding operations to use for encoding a compressed dataset, the one or more encoding operations comprising a differential encoding operation or an entropy encoding operation or both; encoding, by a neural network, a dataset to generate the compressed dataset; quantizing the compressed dataset encoded by the neural network; encoding the quantized and compressed dataset based at least in part on receiving the indication of the one or more encoding operations; and transmitting the encoded, quantized, and compressed dataset to a second device after encoding the compressed dataset based at least in part on the one or more encoding operations.

Aspect 2: The method of aspect 1, wherein receiving the indication of the one or more encoding operations comprises: receiving one or more parameters corresponding to the one or more encoding operations, each of the one or more parameters corresponding to a respective encoding operation of the one or more encoding operations, wherein the quantized and compressed dataset is encoded based at least in part on the one or more parameters.

Aspect 3: The method of any of aspects 1 through 2, wherein encoding the quantized and compressed dataset comprises: encoding the quantized and compressed dataset using the differential encoding operation after encoding the dataset using the neural network.

Aspect 4: The method of any of aspects 1 through 3, wherein encoding the quantized and compressed dataset comprises: encoding the quantized and compressed dataset using the entropy encoding operation after encoding the dataset using the neural network.

Aspect 5: The method of any of aspects 1 through 4, wherein encoding the quantized and compressed dataset comprises: determining, after quantizing the compressed dataset encoded by the neural network, a differential value between a first value of a data in the quantized and compressed dataset at an initial time instance and a second value of the data at a second time instance after the initial time instance, wherein the differential value is determined based at least in part on the indication of the one or more encoding operations and the quantized and compressed dataset is encoded based at least in part on the differential value.

Aspect 6: The method of any of aspects 1 through 5, wherein encoding the quantized and compressed dataset comprises: determining, after quantizing the compressed dataset encoded by the neural network, a differential value between a first reconstruction value of a data in the quantized and compressed dataset at a first time instance and a second reconstruction value of the data at a second time instance after the first time instance, wherein the differential value is determined based at least in part on the indication of the one or more encoding operations and the quantized and compressed dataset is encoded based at least in part on the differential value.

Aspect 7: The method of any of aspects 1 through 6, wherein encoding the quantized and compressed dataset comprises: determining, after quantizing the compressed dataset encoded by the neural network, an initial reconstruction value for a data in the quantized and compressed dataset at an initial time instance associated with encoding the dataset; and determining, after the quantizing, a differential value between an additional reconstruction value of the data at an additional time instance after the initial time instance and the initial reconstruction value for the data, wherein the differential value is determined based at least in part on the indication of the one or more encoding operations and the quantized and compressed dataset is encoded based at least in part on the differential value.

Aspect 8: The method of any of aspects 1 through 7, wherein the differential encoding operation comprises an encoding of an amount of data of the compressed dataset based at least in part on previous values for the amount of data.

Aspect 9: The method of any of aspects 1 through 8, wherein the entropy encoding operation comprises an encoding of the compressed dataset using one or more symbols having lengths that vary based at least in part on a probability that a symbol occurs.

Aspect 10: A method for wireless communications at a device, comprising: transmitting, to a UE, an indication of one or more encoding operations for the UE to use for encoding a compressed dataset, the one or more encoding operations comprising a differential encoding operation or an entropy encoding operation or both; receiving, from the UE, an encoded, quantized, and compressed dataset after the compressed dataset has been encoded following a quantization operation based at least in part on the one or more encoding operations; decoding, based at least in part on the one or more encoding operations, the encoded, quantized, and compressed dataset to generate a compressed dataset; and decoding, by a neural network, the compressed dataset to generate a dataset based at least in part on decoding the encoded, quantized, and compressed dataset.

Aspect 11: The method of aspect 10, wherein transmitting the indication of the one or more encoding operations comprises: transmitting one or more parameters corresponding to the one or more encoding operations, each of the one or more parameters corresponding to a respective encoding operation of the one or more encoding operations, wherein the quantized and compressed dataset is encoded based at least in part on the one or more parameters.

Aspect 12: The method of any of aspects 10 through 11, wherein decoding the encoded, quantized, and compressed dataset comprises: decoding the encoded, quantized, and compressed dataset using a differential decoding operation before decoding the dataset using the neural network.

Aspect 13: The method of any of aspects 10 through 12, wherein decoding the encoded, quantized, and compressed dataset comprises: decoding the encoded, quantized, and compressed dataset using an entropy decoding operation before decoding the dataset using the neural network.

Aspect 14: The method of any of aspects 10 through 13, wherein receiving the encoded, quantized, and compressed dataset comprises: receiving the encoded, quantized, and compressed dataset comprising differential values for data in the dataset that are based at least in part on initial values for the data.

Aspect 15: The method of any of aspects 10 through 14, wherein receiving the encoded, quantized, and compressed dataset comprises: receiving the encoded, quantized, and compressed dataset comprising differential values for data in the dataset that are based at least in part on previous reconstruction values for the data.

Aspect 16: The method of any of aspects 10 through 15, wherein receiving the encoded, quantized, and compressed dataset comprises: receiving the encoded, quantized, and compressed dataset comprising differential values for data in the dataset that are based at least in part on initial reconstruction values for the data.

Aspect 17: The method of any of aspects 10 through 16, wherein the differential decoding operation comprises an encoding of an amount of data of the compressed dataset based at least in part on previous values for the amount of data.

Aspect 18: The method of any of aspects 10 through 17, wherein the entropy decoding operation comprises an encoding of the compressed dataset using one or more symbols having lengths that vary based at least in part on a probability that a symbol occurs.

Aspect 19: An apparatus for wireless communications at a UE, comprising a processor; memory coupled with the processor; and instructions stored in the memory and executable by the processor to cause the apparatus to perform a method of any of aspects 1 through 9.

Aspect 20: An apparatus for wireless communications at a UE, comprising at least one means for performing a method of any of aspects 1 through 9.

Aspect 21: A non-transitory computer-readable medium storing code for wireless communications at a UE, the code comprising instructions executable by a processor to perform a method of any of aspects 1 through 9.

Aspect 22: An apparatus for wireless communications at a device, comprising a processor; memory coupled with the processor; and instructions stored in the memory and executable by the processor to cause the apparatus to perform a method of any of aspects 10 through 18.

Aspect 23: An apparatus for wireless communications at a device, comprising at least one means for performing a method of any of aspects 10 through 18.

Aspect 24: A non-transitory computer-readable medium storing code for wireless communications at a device, the code comprising instructions executable by a processor to perform a method of any of aspects 10 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a second device via a communication link over a carrier, an indication of one or more encoding operations to use for encoding a compressed dataset, the one or more encoding operations comprising a differential encoding operation or an entropy encoding operation or both;
   encoding, by a neural network, a dataset to generate the compressed dataset;
   quantizing the compressed dataset encoded by the neural network;
   encoding the quantized and compressed dataset based at least in part on receiving the indication of the one or more encoding operations; and
   transmitting the encoded, quantized, and compressed dataset to the second device after encoding the compressed dataset based at least in part on the one or more encoding operations.

2. The method of claim 1, wherein receiving the indication of the one or more encoding operations comprises:
   receiving one or more parameters corresponding to the one or more encoding operations, each of the one or more parameters corresponding to a respective encoding operation of the one or more encoding operations, wherein the quantized and compressed dataset is encoded based at least in part on the one or more parameters.

3. The method of claim 1, wherein encoding the quantized and compressed dataset comprises:
   encoding the quantized and compressed dataset using the differential encoding operation after encoding the dataset using the neural network.

4. The method of claim 1, wherein encoding the quantized and compressed dataset comprises:
   encoding the quantized and compressed dataset using the entropy encoding operation after encoding the dataset using the neural network.

5. The method of claim 1, wherein encoding the quantized and compressed dataset comprises:
   determining, after quantizing the compressed dataset encoded by the neural network, a differential value between a first value of a data in the quantized and compressed dataset at an initial time instance and a second value of the data at a second time instance after the initial time instance, wherein the differential value is determined based at least in part on the indication of the one or more encoding operations and the quantized and compressed dataset is encoded based at least in part on the differential value.

6. The method of claim 1, wherein encoding the quantized and compressed dataset comprises:
   determining, after quantizing the compressed dataset encoded by the neural network, a differential value between a first reconstruction value of a data in the quantized and compressed dataset at a first time instance and a second reconstruction value of the data at a second time instance after the first time instance, wherein the differential value is determined based at least in part on the indication of the one or more encoding operations and the quantized and compressed dataset is encoded based at least in part on the differential value.

7. The method of claim 1, wherein encoding the quantized and compressed dataset comprises:
   determining, after quantizing the compressed dataset encoded by the neural network, an initial reconstruction value for a data in the quantized and compressed dataset at an initial time instance associated with encoding the dataset; and
   determining, after quantizing the compressed dataset encoded by the neural network, a differential value between an additional reconstruction value of the data at an additional time instance after the initial time instance and the initial reconstruction value for the data, wherein the differential value is determined based at least in part on the indication of the one or more encoding operations and the quantized and compressed dataset is encoded based at least in part on the differential value.

8. The method of claim 1, wherein the differential encoding operation comprises an encoding of an amount of data of the compressed dataset based at least in part on previous values for the amount of data.

9. The method of claim 1, wherein the entropy encoding operation comprises an encoding of the compressed dataset using one or more symbols having lengths that vary based at least in part on a probability that a symbol occurs.

10. A method for wireless communications at a device, comprising:
  transmitting, to a user equipment (UE) via a communication link over a carrier, an indication of one or more encoding operations for the UE to use for encoding a compressed dataset, the one or more encoding operations comprising a differential encoding operation or an entropy encoding operation or both;
  receiving, from the UE, an encoded, quantized, and compressed dataset after the compressed dataset has been encoded following a quantization operation based at least in part on the one or more encoding operations;
  decoding, based at least in part on the one or more encoding operations, the encoded, quantized, and compressed dataset to generate the compressed dataset; and
  decoding, by a neural network, the compressed dataset to generate a dataset based at least in part on decoding the encoded, quantized, and compressed dataset.

11. The method of claim 10, wherein transmitting the indication of the one or more encoding operations comprises:
  transmitting one or more parameters corresponding to the one or more encoding operations, each of the one or more parameters corresponding to a respective encoding operation of the one or more encoding operations, wherein the quantized and compressed dataset is encoded based at least in part on the one or more parameters.

12. The method of claim 10, wherein decoding the encoded, quantized, and compressed dataset comprises:
  decoding the encoded, quantized, and compressed dataset using a differential decoding operation before decoding the dataset using the neural network.

13. The method of claim 10, wherein decoding the encoded, quantized, and compressed dataset comprises:
  decoding the encoded, quantized, and compressed dataset using an entropy decoding operation before decoding the dataset using the neural network.

14. The method of claim 10, wherein receiving the encoded, quantized, and compressed dataset comprises:
  receiving the encoded, quantized, and compressed dataset comprising differential values for data in the dataset that are based at least in part on initial values for the data.

15. The method of claim 10, wherein receiving the encoded, quantized, and compressed dataset comprises:
  receiving the encoded, quantized, and compressed dataset comprising differential values for data in the dataset that are based at least in part on previous reconstruction values for the data.

16. The method of claim 10, wherein receiving the encoded, quantized, and compressed dataset comprises:
  receiving the encoded, quantized, and compressed dataset comprising differential values for data in the dataset that are based at least in part on initial reconstruction values for the data.

17. An apparatus for wireless communications at a user equipment (UE), comprising:
  one or more processors;
  one or more memories coupled with the one or more processors; and
  instructions stored in the one or more memories and executable by the one or more processors to cause the apparatus to:
    receive, from a second device via a communication link over a carrier, an indication of one or more encoding operations to use to encode a compressed dataset, the one or more encoding operations comprising a differential encoding operation or an entropy encoding operation or both;
    encode, by a neural network, a dataset to generate the compressed dataset;
    quantize the compressed dataset encoded by the neural network;
    encode the quantized and compressed dataset based at least in part on reception of the indication of the one or more encoding operations; and
    transmit the encoded, quantized, and compressed dataset to the second device after the compressed dataset is encoded based at least in part on the one or more encoding operations.

18. The apparatus of claim 17, wherein the instructions to receive the indication of the one or more encoding operations are executable by the one or more processors to cause the apparatus to:
  receive one or more parameters corresponding to the one or more encoding operations, each of the one or more parameters corresponding to a respective encoding operation of the one or more encoding operations, wherein the quantized and compressed dataset is encoded based at least in part on the one or more parameters.

19. The apparatus of claim 17, wherein the instructions to encode the quantized and compressed dataset are executable by the one or more processors to cause the apparatus to:
  encode the quantized and compressed dataset using the differential encoding operation after the dataset is encoded using the neural network.

20. The apparatus of claim 17, wherein the instructions to encode the quantized and compressed dataset are executable by the one or more processors to cause the apparatus to:
  encode the quantized and compressed dataset using the entropy encoding operation after the dataset is encoded using the neural network.

21. The apparatus of claim 17, wherein the instructions to encode the quantized and compressed dataset are executable by the one or more processors to cause the apparatus to:
  determine, after the compressed dataset encoded by the neural network is quantized, a differential value between a first value of a data in the quantized and compressed dataset at an initial time instance and a second value of the data at a second time instance after the initial time instance, wherein the differential value is determined based at least in part on the indication of the one or more encoding operations and the quantized and compressed dataset is encoded based at least in part on the differential value.

22. The apparatus of claim 17, wherein the instructions to encode the quantized and compressed dataset are executable by the one or more processors to cause the apparatus to:
  determine, after the compressed dataset encoded by the neural network is quantized, a differential value between a first reconstruction value of a data in the quantized and compressed dataset at a first time instance and a second reconstruction value of the data at a second time instance after the first time instance, wherein the differential value is determined based at least in part on the indication of the one or more encoding operations and the quantized and compressed dataset is encoded based at least in part on the differential value.

23. The apparatus of claim 17, wherein the instructions to encode the quantized and compressed dataset are executable by the one or more processors to cause the apparatus to:

determine, after the compressed dataset encoded by the neural network is quantized, an initial reconstruction value for a data in the quantized and compressed dataset at an initial time instance associated with the dataset being encoded; and determine, after the compressed dataset encoded by the neural network is quantized, a differential value between an additional reconstruction value of the data at an additional time instance after the initial time instance and the initial reconstruction value for the data, wherein the differential value is determined based at least in part on the indication of the one or more encoding operations and the quantized and compressed dataset is encoded based at least in part on the differential value.

24. An apparatus for wireless communications at a device, comprising:

one or more processors;

one or more memories coupled with the one or more processors; and instructions stored in the one or more memories and executable by the one or more processors to cause the apparatus to:

transmit, to a user equipment (UE) via a communication link over a carrier, an indication of one or more encoding operations for the UE to use to encode a compressed dataset, the one or more encoding operations comprising a differential encoding operation or an entropy encoding operation or both;

receive, from the UE, an encoded, quantized, and compressed dataset after the compressed dataset has been encoded following a quantization operation based at least in part on the one or more encoding operations;

decode, based at least in part on the one or more encoding operations, the encoded, quantized, and compressed dataset to generate the compressed dataset; and decode, by a neural network, the compressed dataset to generate a dataset based at least in part on the encoded, quantized, and compressed dataset being decoded.

25. The apparatus of claim 24, wherein the instructions to transmit the indication of the one or more encoding operations are executable by the one or more processors to cause the apparatus to:

transmit one or more parameters corresponding to the one or more encoding operations, each of the one or more parameters corresponding to a respective encoding operation of the one or more encoding operations, wherein the quantized and compressed dataset is encoded based at least in part on the one or more parameters.

26. The apparatus of claim 24, wherein the instructions to decode the encoded, quantized, and compressed dataset are executable by the one or more processors to cause the apparatus to:

decode the encoded, quantized, and compressed dataset using a differential decoding operation before the dataset using the neural network is decoded.

27. The apparatus of claim 24, wherein the instructions to decode the encoded, quantized, and compressed dataset are executable by the one or more processors to cause the apparatus to:

decode the encoded, quantized, and compressed dataset using an entropy decoding operation before the dataset using the neural network is decoded.

28. The apparatus of claim 24, wherein the instructions to receive the encoded, quantized, and compressed dataset are executable by the one or more processors to cause the apparatus to:

receive the encoded, quantized, and compressed dataset comprising differential values for data in the dataset that are based at least in part on initial values for the data.

29. The apparatus of claim 24, wherein the instructions to receive the encoded, quantized, and compressed dataset are executable by the one or more processors to cause the apparatus to:

receive the encoded, quantized, and compressed dataset comprising differential values for data in the dataset that are based at least in part on previous reconstruction values for the data.

30. The apparatus of claim 24, wherein the instructions to receive the encoded, quantized, and compressed dataset are executable by the one or more processors to cause the apparatus to:

receive the encoded, quantized, and compressed dataset comprising differential values for data in the dataset that are based at least in part on initial reconstruction values for the data.

* * * * *